(12) United States Patent
Harada et al.

(10) Patent No.: US 11,268,259 B2
(45) Date of Patent: Mar. 8, 2022

(54) CONTROL SYSTEM FOR WORK VEHICLE, METHOD FOR SETTING TRAJECTORY OF WORK IMPLEMENT, AND WORK VEHICLE

(71) Applicant: KOMATSU LTD., Tokyo (JP)

(72) Inventors: Junji Harada, Tokyo (JP); Eiji Ishibashi, Tokyo (JP); Yasuhito Yonezawa, Tokyo (JP); Kazuyuki Kirino, Tokyo (JP)

(73) Assignee: KOMATSU LTD., Tokyo (JP)

( * ) Notice: Subject to any disclaimer, the term of this patent is extended or adjusted under 35 U.S.C. 154(b) by 227 days.

(21) Appl. No.: 16/466,416

(22) PCT Filed: Feb. 15, 2018

(86) PCT No.: PCT/JP2018/005295
§ 371 (c)(1),
(2) Date: Jun. 4, 2019

(87) PCT Pub. No.: WO2018/179963
PCT Pub. Date: Oct. 4, 2018

(65) Prior Publication Data
US 2020/0071909 A1    Mar. 5, 2020

(30) Foreign Application Priority Data
Mar. 30, 2017   (JP) .............................. JP2017-067148

(51) Int. Cl.
*E02F 3/84* (2006.01)
*E02F 9/20* (2006.01)
(Continued)

(52) U.S. Cl.
CPC ............ *E02F 3/844* (2013.01); *E02F 9/2041* (2013.01); *G05D 1/0212* (2013.01); *E02F 3/7609* (2013.01)

(58) Field of Classification Search
CPC ............... G05D 1/0212; G05D 1/0274; G05D 2201/0202; E01C 19/004; E02F 3/841; (Continued)

(56) References Cited

U.S. PATENT DOCUMENTS 5,487,428 A  *  1/1996  Yamamoto ............. E02F 3/845
                                                   172/4.5
5,551,518 A  *  9/1996  Stratton ................. E02F 3/845
                                                   172/4.5
(Continued)

FOREIGN PATENT DOCUMENTS

CN   105612369 A   5/2016
CN   106013311 A   10/2016
(Continued)

OTHER PUBLICATIONS

JPO machine translation of JP 4-164210 (original JP document published Jun. 9, 1992) (Year: 1992).*

(Continued)

*Primary Examiner* — Faris S Almatrahi
(74) *Attorney, Agent, or Firm* — Global IP Counselors, LLP

(57) ABSTRACT

A work vehicle includes a work implement. A control system for the work vehicle includes an input device and a controller. The controller is configured to communicate with the input device, receive an input signal indicating an input operation by an operator from the input device, acquire vehicle information including a position of the work vehicle when the input signal is received, and orientation information of the work vehicle when the input signal is received, and determine a target design surface indicating a target trajectory of the work implement based on the vehicle information and the orientation information when the input signal is received.

22 Claims, 21 Drawing Sheets

(51) Int. Cl.
  *G05D 1/02* (2020.01)
  *E02F 3/76* (2006.01)
(58) Field of Classification Search
  CPC . E02F 3/842; E02F 3/844; E02F 3/845; E02F 3/847; E02F 9/2037; E02F 9/2041; E02F 9/2045; E02F 9/205; E02F 9/262
  See application file for complete search history.

(56) References Cited

U.S. PATENT DOCUMENTS

| | | | |
|---|---|---|---|
| 5,854,988 A * | 12/1998 | Davidson | E02F 9/26 701/50 |
| 5,924,493 A | 7/1999 | Hartman et al. | |
| 5,951,613 A | 9/1999 | Sahm et al. | |
| 5,964,298 A * | 10/1999 | Greenspun | E02F 3/842 172/4.5 |
| 5,987,371 A * | 11/1999 | Bailey | E02F 3/842 701/472 |
| 6,076,029 A * | 6/2000 | Watanabe | E02F 3/437 701/50 |
| 6,191,732 B1 * | 2/2001 | Carlson | E02F 3/842 342/357.3 |
| 6,532,409 B1 * | 3/2003 | Fujishima | E02F 9/2045 701/50 |
| 8,983,738 B2 * | 3/2015 | Avitzur | E02F 9/205 701/50 |
| 9,260,837 B1 * | 2/2016 | Wei | E02F 3/841 |
| 9,328,479 B1 * | 5/2016 | Rausch | E02F 3/847 |
| 10,066,367 B1 * | 9/2018 | Wang | E02F 9/2029 |
| 2002/0162668 A1 * | 11/2002 | Carlson | E02F 3/847 172/4.5 |
| 2005/0027420 A1 * | 2/2005 | Fujishima | E02F 9/2045 701/50 |
| 2005/0197755 A1 * | 9/2005 | Knowlton | G01S 19/50 701/50 |
| 2005/0197756 A1 * | 9/2005 | Taylor | E02F 3/847 701/50 |
| 2009/0056961 A1 * | 3/2009 | Gharsalli | E02F 3/844 172/4.5 |
| 2009/0069987 A1 * | 3/2009 | Omelchenko | G01S 19/14 701/50 |
| 2009/0112410 A1 * | 4/2009 | Shull | B25J 9/1664 701/50 |
| 2009/0256860 A1 * | 10/2009 | Nichols | G01S 19/40 345/632 |
| 2010/0299031 A1 * | 11/2010 | Zhdanov | E02F 3/845 701/50 |
| 2011/0213529 A1 * | 9/2011 | Krause | E02F 3/431 701/50 |
| 2012/0318539 A1 * | 12/2012 | Joergensen | E02F 3/845 172/1 |
| 2013/0006484 A1 * | 1/2013 | Avitzur | G05D 1/0274 701/50 |
| 2013/0081831 A1 * | 4/2013 | Hayashi | E02F 3/847 172/4.5 |
| 2013/0085644 A1 * | 4/2013 | Hayashi | E02F 3/847 701/50 |
| 2013/0087350 A1 * | 4/2013 | Hayashi | E02F 3/844 172/2 |
| 2013/0090817 A1 * | 4/2013 | Hayashi | E02F 3/847 701/50 |
| 2014/0012404 A1 | 1/2014 | Taylor et al. | |
| 2014/0107896 A1 * | 4/2014 | Fehr | E02F 3/845 701/50 |
| 2014/0180548 A1 * | 6/2014 | Edara | G05B 13/024 701/50 |
| 2014/0257646 A1 | 9/2014 | Ishibashi et al. | |
| 2014/0330508 A1 | 11/2014 | Montgomery | |
| 2015/0019086 A1 * | 1/2015 | Hayashi | E02F 3/844 701/50 |
| 2015/0292179 A1 * | 10/2015 | Joergensen | E02F 3/431 701/50 |
| 2015/0354169 A1 | 12/2015 | Wei et al. | |
| 2016/0040397 A1 | 2/2016 | Kontz | |
| 2016/0076223 A1 | 3/2016 | Wei et al. | |
| 2016/0122969 A1 * | 5/2016 | Noborio | E02F 3/7613 701/50 |
| 2016/0153166 A1 * | 6/2016 | Gentle | E02F 9/2012 172/781 |
| 2016/0237651 A1 | 8/2016 | Miyamoto et al. | |
| 2017/0030052 A1 * | 2/2017 | Wei | E02F 9/2041 |

FOREIGN PATENT DOCUMENTS

| | | | | |
|---|---|---|---|---|
| CN | 107313475 A | | 11/2017 | |
| JP | 04164210 A | * | 6/1992 | E02F 9/2045 |
| JP | 10-141955 A | | 5/1998 | |
| JP | 2001-303620 A | | 10/2001 | |
| JP | 2001303620 A | * | 10/2001 | |
| JP | 5247939 B1 | | 7/2013 | |
| JP | 2014-173321 A | | 9/2014 | |
| WO | 2008/118027 A2 | | 10/2008 | |
| WO | WO-2008118027 A2 | * | 10/2008 | E02F 9/2045 |
| WO | 2013/051379 A1 | | 4/2013 | |
| WO | 2015/083469 A1 | | 6/2015 | |

OTHER PUBLICATIONS

Trimble(R) GCS900 Grade Control System for Earthmoving Applications Reference Manual, Version 12.70, Apr. 2015, 236 pages (Year: 2015).*
The Office Action for the corresponding Chinese application No. 201880006078.0, dated Aug. 4, 2020.
The International Search Report for the corresponding international application No. PCT/JP2018/005295, dated Mar. 20, 2018.
The Office Action for the corresponding Chinese application No. 201880006078.0, dated Mar. 3, 2021.
The Office Action for the corresponding Japanese application No. 2019-508739, dated Aug. 17, 2021.

* cited by examiner

CONTROL SYSTEM FOR WORK VEHICLE, METHOD FOR SETTING TRAJECTORY OF WORK IMPLEMENT, AND WORK VEHICLE

CROSS-REFERENCE TO RELATED APPLICATIONS

This application is a U.S. National stage application of International Application No. PCT/JP2018/005295, filed on Feb. 15, 2018. This U.S. National stage application claims priority under 35 U.S.C. § 119(a) to Japanese Patent Application No. 2017-067148, filed in Japan on Mar. 30, 2017, the entire contents of which are hereby incorporated herein by reference.

BACKGROUND

Field of the Invention

The present invention relates to a control system for a work vehicle, a method for setting a trajectory of a work implement, and a work vehicle.

Background Information

Conventionally, in work vehicles such as bulldozers or graders, automatic control has been proposed for automatically adjusting the position of a work implement. For example, Japanese Patent No. 5,247,939 discloses digging control and ground leveling control.

In digging control, the position of the blade is automatically adjusted so that the load on the blade matches the target load. In the ground leveling control, the position of the blade is automatically adjusted such that the tip of the blade moves along the final design surface indicating the target finished shape to be dug.

SUMMARY

According to the conventional control described above, the occurrence of shoe slip can be suppressed by raising the blade when the load on the blade becomes excessively large. Thereby, the work can be performed efficiently.

However, in the conventional control, as shown in FIG. 26, the blade is first controlled along the final design surface 100. Thereafter, when the load on the blade increases, the blade is raised by load control (see the blade trajectory 200 in FIG. 26). Therefore, when digging a large uneven topography 300, the load on the blade may increase rapidly, which may cause the blade to ascend rapidly. In that case, it is difficult to carry out the digging work smoothly because the topography with large irregularities is to be formed. In addition, it is feared that the topography to be excavated tends to be rough and the quality of the finish is degraded.

In addition to the digging work, the work performed by the work vehicle includes a filling work. In the filling work, the work vehicle cuts out the soil from the cut earth part by the work implement. Then, the work vehicle places the cut out soil at a predetermined position by the work implement. The soil is compacted by the work vehicle traveling on filled soil or by rollers. Thereby, for example, it is possible to fill the recessed topography and form it into a flat shape.

However, in the above-described automatic control, it is also difficult to perform a good filling work. For example, as shown in FIG. 27, in the ground leveling control, the position of the blade is automatically adjusted such that the tip of the blade moves along the final design surface 100. Therefore, when the filling work is performed by the ground leveling control on the large uneven topography 300, a large amount of soil is accumulated at a position in front of the work vehicle at one time as shown by a broken line 400 in FIG. 27. In that case, since the thickness of the filled soil is large, it becomes difficult to compact the filled soil. Therefore, there is a problem that the quality of the finish of work falls.

An object of the present invention is to provide a control system for a work vehicle, a method for setting a trajectory of a work implement, and a work vehicle capable of performing work with high quality and finish efficiently by automatic control.

A first aspect is a control system for a work vehicle including a work implement, and the control system includes an input device and a controller configured to communicate with the input device. The controller is programmed to perform the following processing. The controller receives from the input device an input signal indicating an input operation by an operator. The controller acquires vehicle information including a position of the work vehicle when the input signal is received and orientation information of the work vehicle when the input signal is received. The controller determines a target design surface indicating a target trajectory of the work implement based on the vehicle information and the orientation information when the input signal is received.

A second aspect is a method for setting a target trajectory of a work implement of a work vehicle, and the method for setting the target trajectory includes the following processing. The first process is to receive an input signal indicating an input operation by an operator. The second process is to acquire vehicle information including a position of the work vehicle when the input signal is received, and orientation information of the work vehicle when the input signal is received. The third process is to determine a target design surface indicating a target trajectory of the work implement based on the vehicle information and the orientation information when the input signal is received.

A third aspect is a work vehicle, and the work vehicle includes a work implement, an input device, and a controller. The controller is programmed to perform the following processing. The controller receives from the input device an input signal indicating an input operation by an operator. The controller acquires vehicle information including a position of the work vehicle when the input signal is received and orientation information of the work vehicle when the input signal is received. The controller determines a target design surface indicating a target trajectory of the work implement based on the vehicle information and the orientation information when the input signal is received. The controller controls the work implement according to the target design surface.

According to the present invention, by controlling the work implement in accordance with the target design surface, it is possible to perform digging work while suppressing an excessive load on the work implement. Thereby, the quality of the work finish can be improved. In addition, automatic control can improve the efficiency of work.

BRIEF DESCRIPTION OF DRAWINGS

FIG. 4 is a diagram showing an example of a design surface and an actual surface.

FIG. 5 is a flowchart showing processing of automatic control for the work implement.

DETAILED DESCRIPTION OF EMBODIMENT(S)

Figure 1:
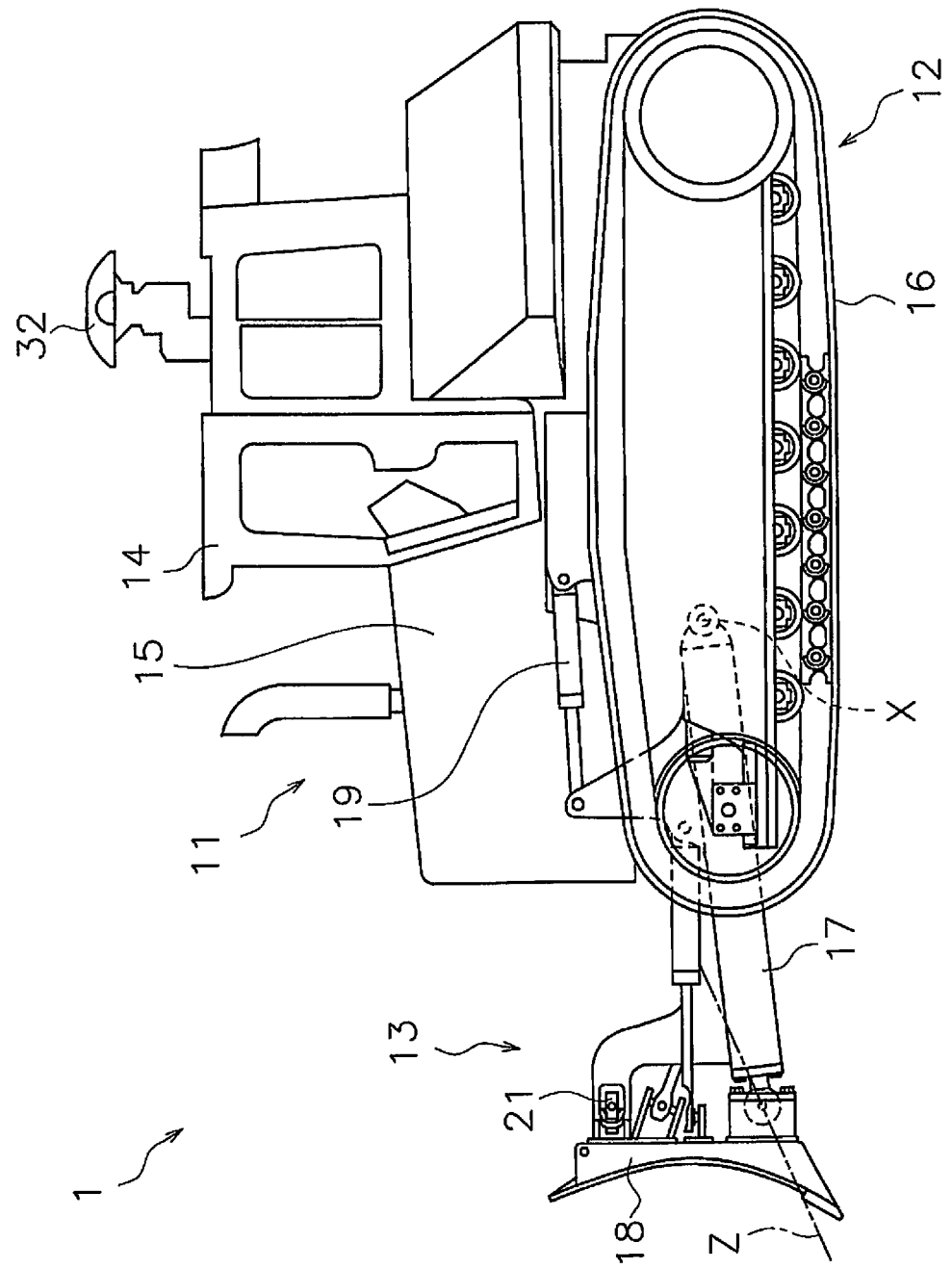
FIG. 1 is a side view showing a work vehicle according to the embodiment.

Hereinafter, a work vehicle according to an embodiment will be described with reference to the drawings. FIG. 1 is a side view showing a work vehicle 1 according to the embodiment. The work vehicle 1 according to the present embodiment is a bulldozer. The work vehicle 1 includes a vehicle body 11, a traveling device 12, and a work implement 13.

The vehicle body 11 includes an operating cabin 14 and an engine compartment 15. A driver's seat (not shown) is disposed in the operating cabin 14. The engine compartment 15 is disposed in front of the operating cabin 14. The traveling device 12 is attached to the lower portion of the vehicle body 11. The traveling device 12 includes a pair of right and left crawler belts 16. In FIG. 1, only the left crawler belt 16 is illustrated. As the crawler belt 16 rotates, the work vehicle 1 travels. The traveling of the work vehicle 1 may be any of autonomous traveling, semi-autonomous traveling, and traveling by the operation of the operator.

The work implement 13 is attached to the vehicle body 11. The work implement 13 includes a lift frame 17, a blade 18, a lift cylinder 19 and a tilt cylinder 21.

The lift frame 17 is mounted to the vehicle body 11 so as to be movable up and down around an axisx extending in the vehicle width direction. The lift frame 17 supports the blade 18. The blade 18 is disposed in front of the vehicle body 11. The blade 18 moves up and down as the lift frame 17 moves up and down.

The lift cylinder 19 is connected to the vehicle body 11 and the lift frame 17. The lift cylinder 19 rotates up and down about the axis X by the expansion and contraction of the lift cylinder 19.

The tilt cylinder 21 is connected to the lift frame 17 and the blade 18. The expansion and contraction of the tilt cylinder 21 rotates the blade 18 about an axis Z extending substantially in the longitudinal direction of the vehicle.

Figure 2:
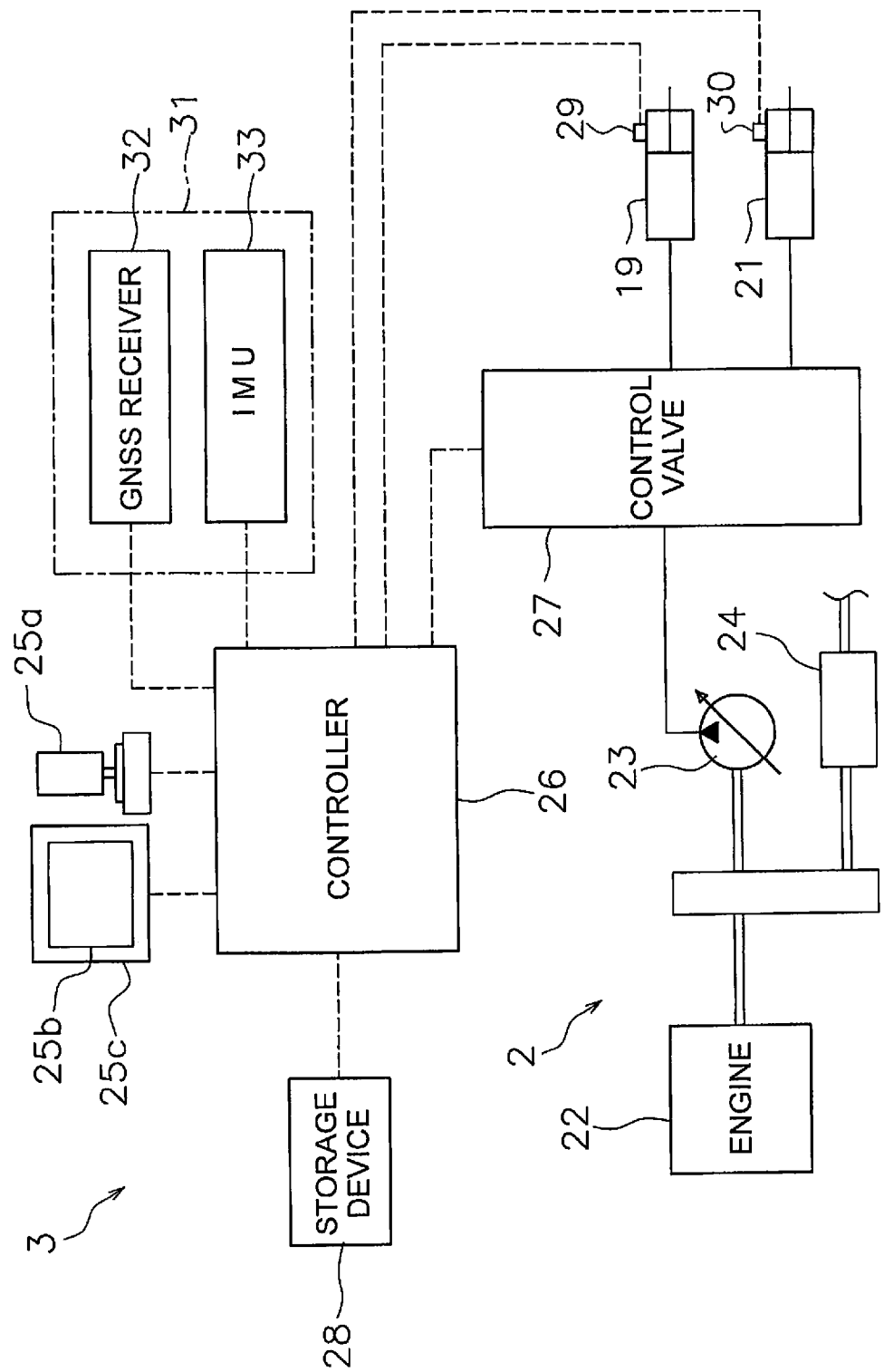
FIG. 2 is a block diagram showing a configuration of a drive system and a control system for the work vehicle.

FIG. 2 is a block diagram showing the configuration of the drive system 2 of the work vehicle 1 and the control system 3. As shown in FIG. 2, the drive system 2 includes an engine 22, a hydraulic pump 23, and a power transmission device 24.

The hydraulic pump 23 is driven by the engine 22 and discharges hydraulic fluid. The hydraulic fluid discharged from the hydraulic pump 23 is supplied to the lift cylinder 19 and the tilt cylinder 21. Although one hydraulic pump 23 is illustrated in FIG. 2, a plurality of hydraulic pumps may be provided.

The power transmission device 24 transmits the driving force of the engine 22 to the traveling device 12. The power transmission device 24 may be, for example, HST (Hydro Static Transmission). Alternatively, the power transmission device 24 may be, for example, a torque converter or a transmission having a plurality of transmission gears.

The control system 3 includes an operating device 25a, an input device 25b, a display 25c, a controller 26, a control valve 27, and a storage device 28. The operating device 25a is a device for operating the work implement 13 and the traveling device 12. The operating device 25a is disposed in the operating cabin 14. The operating device 25a receives an operation by an operator for driving the work implement 13 and the traveling device 12, and outputs an operation signal according to the operation. The operating device 25a includes, for example, an operating lever, a pedal, a switch, and the like.

For example, the operating device 25a for the traveling device 12 is configured to be operable at a forward position, a reverse position, and a neutral position. An operation signal indicating the position of the operating device 25a is output to the controller 26. The controller 26 controls the traveling device 12 or the power transmission device 24 so that the work vehicle 1 advances when the operating position of the operating device 25a is the forward position. When the operation position of the operating device 25a is the reverse position, the controller 26 controls the traveling device 12 or the power transmission device 24 so that the work vehicle 1 moves backward.

The input device 25b and the display 25c are, for example, a touch panel type of display input device. The display 25c is, for example, an LCD or an OLED. However, the display 25c may be another type of display device. The input device 25b and the display 25c may be separate devices from each other. For example, the input device 25b may be an input device such as a switch. The input device 25b outputs an operation signal indicating an operation by the operator to the controller 26.

The controller 26 is programmed to control the work vehicle 1 based on the acquired data. The controller 26 includes, for example, a processor such as a CPU. The controller 26 acquires an operation signal from the operating device 25a. The controller 26 controls the control valve 27 based on the operation signal. The controller 26 acquires the operation signal from the input device 25b. The controller 26 outputs a signal to display a predetermined screen on the display 25c.

The control valve 27 is a proportional control valve, and is controlled by a command signal from the controller 26. The control valve 27 is disposed between a hydraulic actuator such as the lift cylinder 19 and the tilt cylinder 21 and the hydraulic pump 23. The control valve 27 controls the flow rate of the hydraulic fluid supplied from the hydraulic pump 23 to the lift cylinder 19 and the tilt cylinder 21. The controller 26 generates a command signal to the control valve 27 so that the blade 18 operates in response to the operation of the operating device 25a described above. Thus, the lift cylinder 19 is controlled in accordance with the amount of operation of the operating device 25a. Alternatively, the tilt cylinder 21 is controlled in accordance with the amount of operation of the operating device 25a. The control valve 27 may be a pressure proportional control valve. Alternatively, the control valve 27 may be an electromagnetic proportional control valve.

Figure 3:
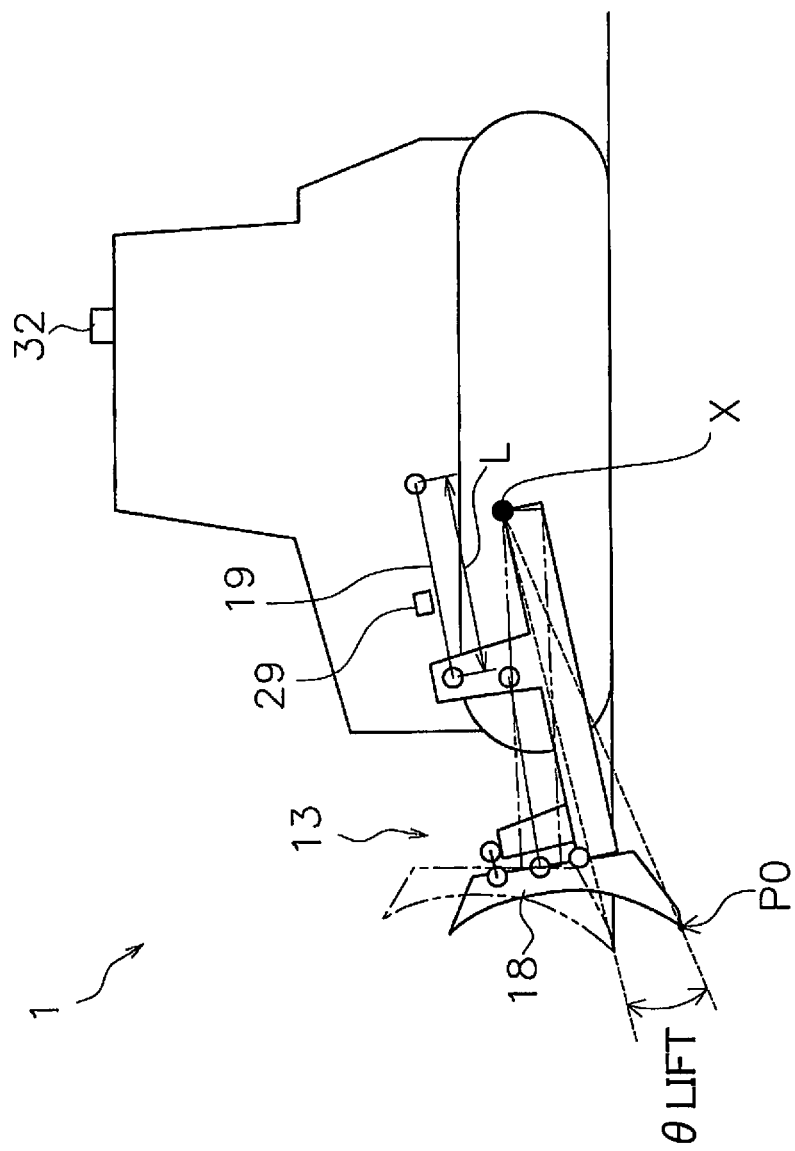
FIG. 3 is a schematic view showing a configuration of the work vehicle.

The control system 3 includes a lift cylinder sensor 29. The lift cylinder sensor 29 detects the stroke length of the lift cylinder 19 (hereinafter referred to as "lift cylinder length L"). As shown in FIG. 3, the controller 26 calculates the lift angle θlift of the blade 18 based on the lift cylinder length L. FIG. 3 is a schematic view showing the configuration of the work vehicle 1.

In FIG. 3, the origin position of the work implement 13 is indicated by a two-dot chain line. The origin position of the work implement 13 is the position of the blade 18 in a state where the tip of the blade 18 is in contact with the ground on a horizontal surface. The lift angle θlift is an angle from the origin position of the work implement 13.

As shown in FIG. 2, the control system 3 includes a tilt cylinder sensor 30. The tilt cylinder sensor 30 detects the stroke length of the tilt cylinder 21. Similar to the lift angle θlift, the controller 26 calculates the tilt angle of the blade 18 based on the stroke length of the tilt cylinder 21.

As shown in FIG. 2, the control system 3 includes a position sensing device 31. The position sensing device 31 measures the position of the work vehicle 1. The position sensing device 31 includes a Global Navigation Satellite System (GNSS) receiver 32 and an IMU 33. The GNSS receiver 32 is, for example, a receiver for GPS (Global Positioning System). The antenna of the GNSS receiver 32 is arranged on the operating cabin 14. The GNSS receiver 32 receives a positioning signal from a satellite, calculates the position of the antenna based on the positioning signal, and generates vehicle body position data. The controller 26 acquires the vehicle body position data from the GNSS receiver 32.

The IMU 33 is an inertial measurement unit. The IMU 33 acquires vehicle body inclination angle data and vehicle body acceleration data. The vehicle body inclination angle data includes an angle (pitch angle) to the horizontal in the longitudinal direction of the vehicle and an angle (roll angle) to the horizontal in the lateral direction of the vehicle. The vehicle body acceleration data includes the acceleration of the work vehicle 1. The controller 26 acquires the vehicle body inclination angle data and the vehicle body acceleration data from the IMU 33.

The controller 26 calculates a blade tip position P0 from the lift cylinder length L, the vehicle body position data, and the vehicle inclination angle data. As shown in FIG. 3, the controller 26 calculates global coordinates of the GNSS receiver 32 based on the vehicle body position data. The controller 26 calculates the lift angle θlift based on the lift cylinder length L. The controller 26 calculates local coordinates of the blade tip position P0 with respect to the GNSS receiver 32, based on the lift angle θlift and the vehicle body dimension data.

The controller 26 calculates the traveling direction of the work vehicle 1 and the vehicle speed from the vehicle body position data and the vehicle acceleration data. The vehicle body dimension data is stored in the storage device 28 and indicates the position of the work implement 13 with respect to the GNSS receiver 32. The controller 26 calculates the global coordinates of the blade tip position P0 based on the global coordinates of the GNSS receiver 32, the local coordinates of the blade tip position P0, and the vehicle body inclination angle data. The controller 26 acquires the global coordinates of the blade tip position P0 as blade tip position data. The blade tip position P0 may be calculated directly by attaching the GNSS receiver to the blade 18.

The storage device 28 includes, for example, a memory and an auxiliary storage device. The storage device 28 may be, for example, a RAM or a ROM. The storage device 28 may be a semiconductor memory or a hard disk. The storage device 28 is an example of a non-transitory computer readable recording medium. The storage device 28 stores computer instructions which are executable by the processor for controlling the work vehicle 1.

The storage device 28 stores work site topography data. The work site topography data indicates the actual topography of the work site. The work site topography data is, for example, a topographical survey map in a three-dimensional data format. The work site topography data can be obtained, for example, by aviation laser survey.

The controller 26 acquires actual topography data. The actual topography data indicates the actual surface 50 of the work site. The actual surface 50 is the topography of a region along the traveling direction of the work vehicle 1. The actual topography data is obtained by calculation in the controller 26 from work site topography data and the position and traveling direction of the work vehicle 1 obtained from the position sensing device 31 described above. Further, as described later, the actual topography data is acquired by the work vehicle 1 traveling.

FIG. 4 is a view showing an example of a cross section of the actual surface 50. As shown in FIG. 4, the actual topography data includes the height of the actual surface 50 at a plurality of reference points. In detail, the actual topography data includes the heights Z0 to Zn of the actual surface 50 at a plurality of reference points in the traveling direction of the work vehicle 1. The plurality of reference points are arranged at predetermined intervals. The predetermined interval is, for example, 1 m, but may be another value.

In FIG. 4, the vertical axis indicates the height of the topography, and the horizontal axis indicates the distance from the current position in the traveling direction of the work vehicle 1. The current position may be a position determined based on the current blade tip position P0 of the work vehicle 1. The current position may be determined based on the current position of another portion of the work vehicle 1.

The storage device 28 stores design surface data. The design surface data indicates the design surfaces 60 and 70 which are target trajectories of the work implement 13. The storage device 28 stores a plurality of design surface data indicating the plurality of design surfaces 60 and 70.

As shown in FIG. 4, the design surface data includes the heights of the design surfaces 60 and 70 at a plurality of reference points, as with the actual topography data. The plurality of design surfaces 60 and 70 includes a final design surface 70. The final design surface 70 is the final target shape of the work site surface. The final design surface 70 is, for example, an earthmoving execution plan in a three-dimensional data format, and is stored in advance in the storage device 28. In FIG. 4, the final design surface 70 has a flat shape parallel to the horizontal direction, but may have a different shape.

The plurality of design surfaces 60 and 70 includes an intermediate design surface 60 other than the final design surface 70. At least a portion of the design surface 60 is located between the final design surface 70 and the actual surface 50. The controller 26 is configured to generate a desired design surface 60, generate design surface data indicating the design surface 60, and store the design surface data in the storage device 28.

The controller 26 automatically controls the work implement 13 based on the actual topography data, the design surface data, and the blade tip position data. The automatic control of the work implement 13 executed by the controller 26 will be described below. FIG. 5 is a flowchart showing the process of automatic control of the work implement 13.

As shown in FIG. 5, in step S101, the controller 26 acquires the current position data. Here, the controller 26 acquires the current blade tip position P0 of the work implement 13 as described above. In step S102, the controller 26 acquires the design surface data. The controller 26 acquires the design surface data from the storage device 28.

In step S103, the controller 26 acquires the actual topography data. As described above, the controller 26 acquires the actual topography data from the work site topography data and the position and the traveling direction of the work vehicle 1. In addition, the controller 26 acquires the actual topography data indicating the actual surface 50 by moving the work vehicle 1 on the actual surface 50.

For example, the controller 26 acquires the position data indicating the latest trajectory of the blade tip position P0 as actual topography data. The controller 26 updates the work site topography data with the acquired actual topography data. Alternatively, the controller 26 may calculate the position of the bottom surface of the crawler belt 16 from the vehicle body position data and the vehicle body dimension data, and may acquire the position data indicating the trajectory of the bottom surface of the crawler belt 16 as the actual topography data.

Alternatively, the actual topography data may be generated from survey data measured by a survey device outside the work vehicle 1. For example, aviation laser surveying may be used as an external survey device. Alternatively, the actual surface 50 may be photographed by a camera, and the actual topography data may be generated from image data obtained by the camera. For example, aerial surveying with a UAV (Unmanned Aerial Vehicle) may be used.

In step S104, the controller 26 determines a target design surface. The controller 26 determines the design surface 60 and 70 selected by the operator as the target design surface.

Alternatively, the design surface 60 and 70 automatically selected or generated by the controller 26 may be determined as the target design surface.

In step S105, the controller 26 controls the work implement 13. The controller 26 automatically controls the work implement 13 in accordance with the target design surface. Specifically, the controller 26 generates a command signal to the work implement 13 so that the blade tip position of the blade 18 moves toward the target design surface. The generated command signal is input to the control valve 27. Thereby, the blade tip position P0 of the work implement 13 moves along the target design surface.

For example, when the target design surface is located above the actual surface 50, the work implement 13 deposits soil on the actual surface 50. In addition, when the target design surface is located below the actual surface 50, the actual surface 50 is dug by the work implement 13.

The controller 26 may start control of the work implement 13 when a signal for operating the work implement 13 is output from the operating device 25*a*. The movement of the work vehicle 1 may be performed manually by the operator operating the operating device 25*a*. Alternatively, movement of the work vehicle 1 may be automatically performed by a command signal from the controller 26.

The above process is performed while the work vehicle 1 is moving forward in the traveling direction. For example, when the operating device 25*a* for the traveling device 12 is at the forward position, the above-described process is performed to automatically control the work implement 13. When the work vehicle 1 moves backward, the controller 26 stops controlling the work implement 13.

Figure 6:
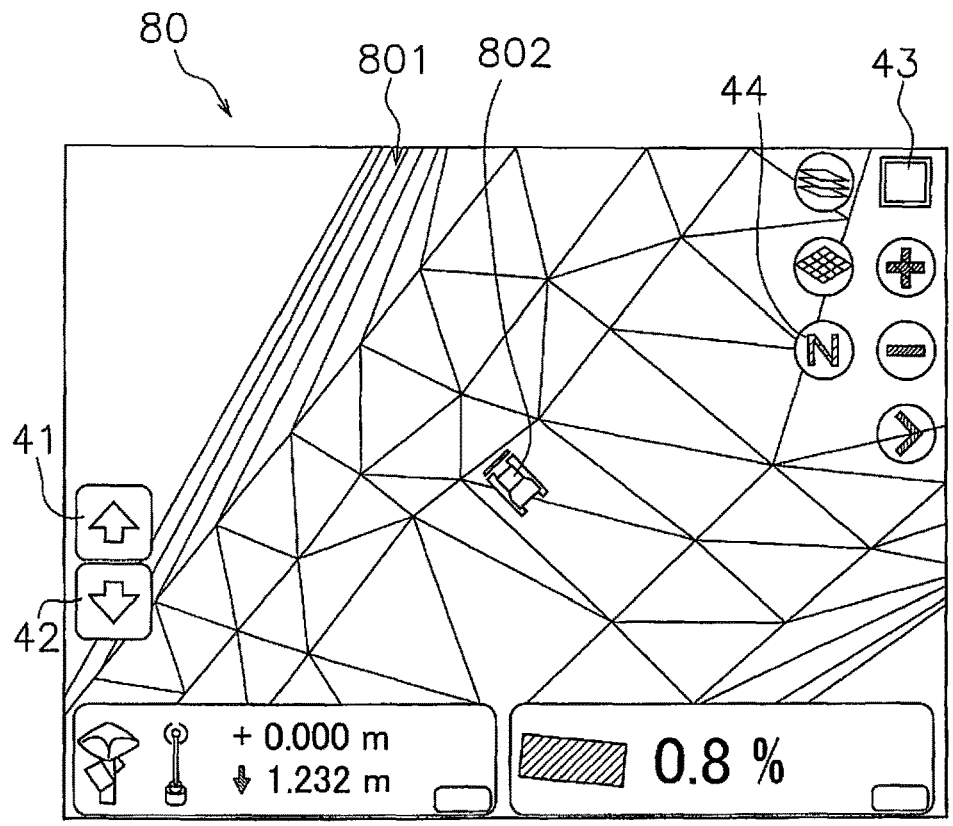
FIG. 6 is a view showing an example of the operation screen on the display.

Next, the generation function of the design surface 60 will be described. The controller 26 can generate a desired design surface 60 and set it as a target design surface. FIG. 6 is a diagram showing an example of the operation screen 80 displayed on the display 25*c*.

As shown in FIG. 6, the operation screen 80 includes a top view including an image 801 indicating the topography of the work site and an icon 802 indicating the current position of the work vehicle 1. The image 801 may indicate the actual surface 50 described above. In the top view of the operation screen 80, the topography of the work site may be displayed in different display modes depending on the distance between the actual surface 50 and the target design surface. For example, the controller 26 may display the actual surface 50 in different colors depending on the distance between the actual surface 50 and the target design surface. As a result, the operator can easily grasp which portion of the actual surface 50 is not filled with soil or where there is not enough filled soil by looking at the operation screen 80.

Operation screen 80 includes a plurality of operation keys 41-43. For example, the operation screen 80 includes an up key 41, a down key 42, and a screen switching key 43. The up key 41 is a key for elevating the target design surface by a predetermined distance. The down key 42 is a key for lowering the target design surface by a predetermined distance. The screen switching key 43 is a key for switching the operation screen 80 displayed on the display 25 *c*.

Operation screen 80 includes mode selection key 44. The mode selection key 44 is a key for selecting a control mode of automatic control from a plurality of modes. In the present embodiment, the operator can select the control mode from the normal mode, the first mode, the second mode, and the third mode by operating the mode selection key 44.

For example, each time the operator presses the mode selection key 44, the mode selection key 44 is sequentially switched to a decision button for the normal mode, a decision button for the first mode, a decision button for the second mode, and a decision button for the third mode. A long press of any of the decision buttons by the operator determines the corresponding mode as the control mode.

Note that the decision button for the normal mode, the decision button for the first mode, the decision button for the second mode, and the decision button for the third mode are not limited to the common mode selection key 44, but are mutually different keys.

In the normal mode, the work implement is controlled in accordance with the target design surface located between the final design surface 70 and the actual surface 50. The controller 26 generates an intermediate design surface 61 located between the final design surface 70 and the actual surface 50 from the design surface data indicating the final design surface 70 and the actual topography data, and determines it as a target design surface.

For example, as shown in FIG. 4, the controller 26 determines a surface obtained by displacing the actual surface 50 in the vertical direction by a predetermined distance as the intermediate design surface 61. The controller 26 may correct a part of the intermediate design surface 61 so that the amount of soil excavated by the work implement 13 has an appropriate value. In addition, when the inclination angle of the intermediate design surface 61 is steep, the controller 26 may correct a part of the intermediate design surface 61 so that the inclination angle becomes gentle.

Figure 7:
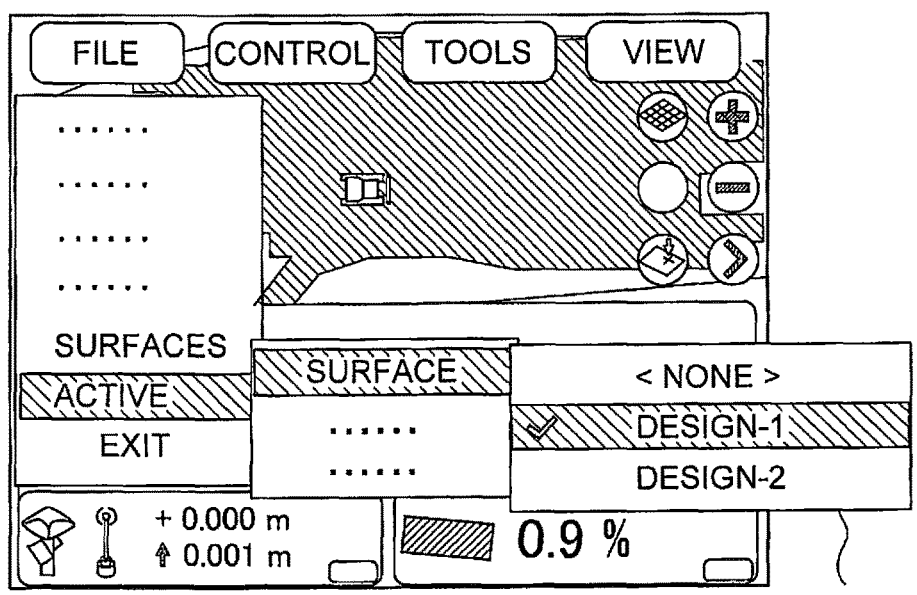
FIG. 7 is a diagram showing an example of the operation screen for selecting a target design surface.

Alternatively, in the normal mode, the controller 26 may set the design surface 60 selected by the operator as the target design surface, as described above. FIG. 7 is a view showing an example of the operation screen 81 for selecting a target design surface. The operation screen 81 includes a list 811 of a plurality of saved design surface data. The operator selects design surface data of the design surfaces 60 and 70 to be activated from the plurality of design surface data in the list 811. The controller 26 determines the activated design surface 60 and 70 as the target design surface described above.

In the first to third modes, the operator can easily generate a desired design surface 60 and set it as a target design surface. In the first to third modes, the controller 26 selects the design surface 60 based on the input operation of the input device 25*b* by the operator, the vehicle information, and the orientation information regardless of the final design surface 70 and the actual surface 50. In the following description, the design surface 60 generated in the first to third modes is referred to as a "simplified design surface 62".

Figure 8:
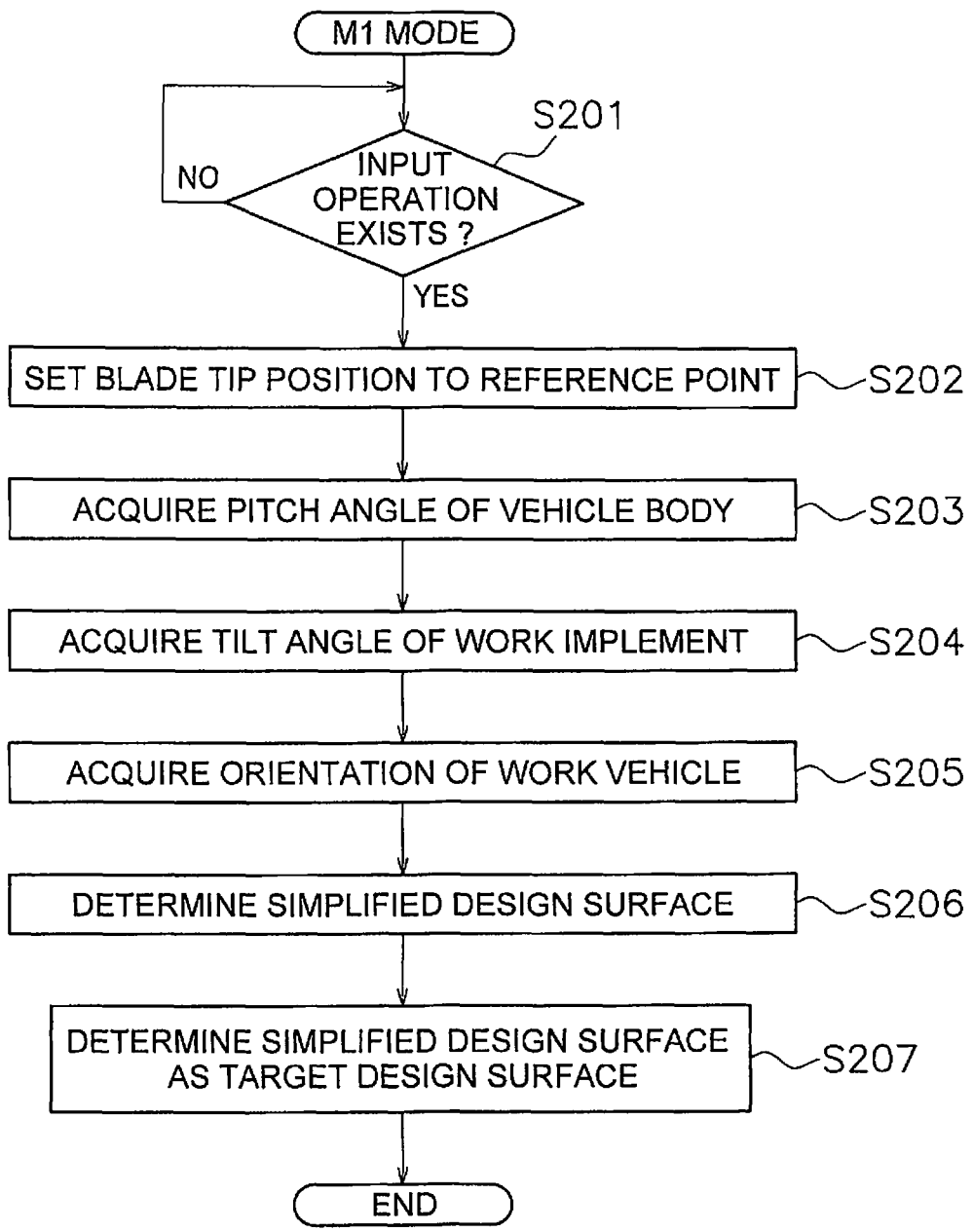
FIG. 8 is a flowchart showing processing in a first mode.

In the first mode, position information indicating the position of work vehicle 1 (hereinafter referred to as "reference point P1") and orientation information indicating the direction of work vehicle 1 at the time when the input operation by the operator is performed are stored. In the first mode, a flat plane passing through the position of the work vehicle 1 at the time when the input operation by the operator is performed and extending toward the orientation of the work vehicle 1 is generated as the simplified design surface 62. FIG. 8 is a flowchart showing processing in the first mode.

As shown in FIG. 8, in step S201, the controller 26 determines the presence or absence of the input operation by the operator for determining the reference point P1. When the controller 26 receives an input signal indicating the input operation by the operator for determining the reference point P1 from the input device 25*b*, the controller 26 determines that the input operation by the operator is present.

Figure 9:
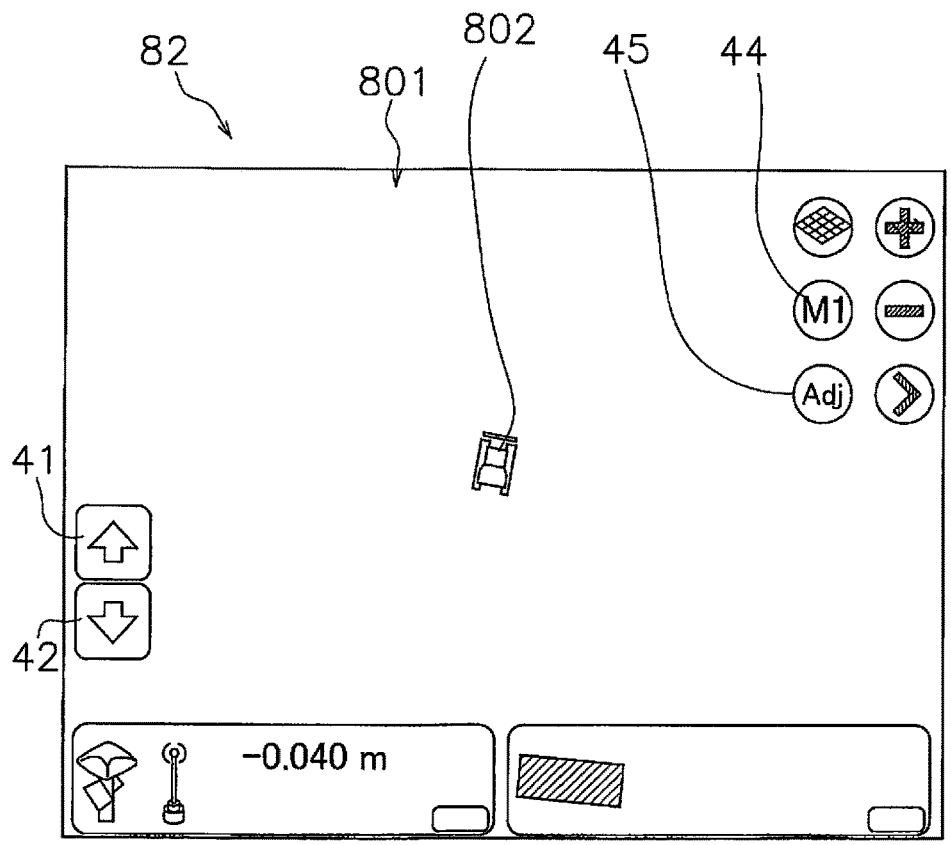
FIG. 9 is a view showing an example of the operation screen in the first mode.

Specifically, FIG. 9 is a view showing an example of the operation screen 82 in the first mode. As shown in FIG. 9, when a long press of the decision button (44) for the first mode on the operation screen 82 is performed, the controller 26 determines that there is an input operation by the operator for determining the reference point P1.

Figure 10:
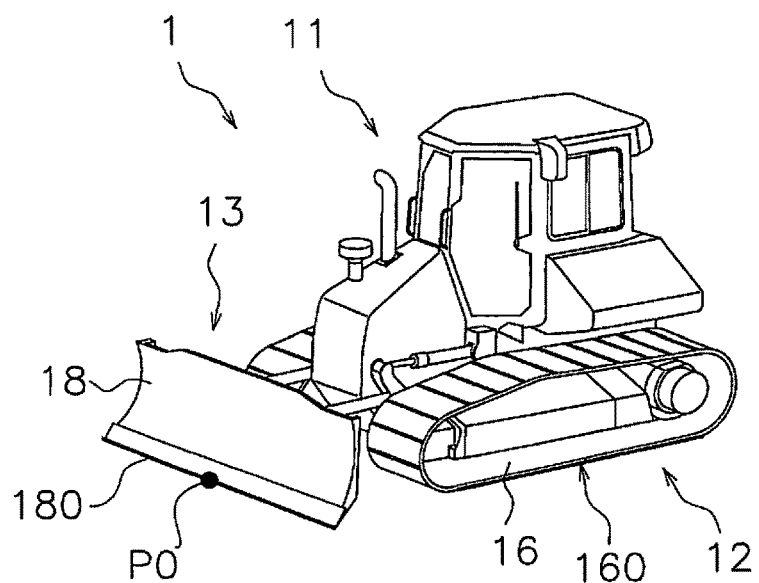
FIG. 10 is a diagram showing a pitch angle and a tilt angle.

In steps S202 to S204, the controller 26 acquires the vehicle information when the input operation by the operator is performed. Specifically, in step S202, the controller 26 acquires the blade tip position P0 when the input operation by the operator is performed, and sets it to the reference point P1. More specifically, as shown in FIG. 10, the controller 26 sets the center of the tip 180 of the blade 18 in the left-right direction of the vehicle as the blade tip position P0 at the reference point P1.

In step S203, the controller 26 acquires the pitch angle of the vehicle body 11 when the input operation by the operator is performed. As shown in FIG. 10, the pitch angle of the vehicle body 11 is an angle with respect to the horizontal direction of the bottom surface 160 of the crawler belt 16 extending in the longitudinal direction of the vehicle. The pitch angle of the vehicle body 11 is acquired from the vehicle body inclination angle data from the IMU 33.

In step S204, the controller 26 acquires the tilt angle of the work implement 13 when the input operation by the operator is performed. As shown in FIG. 10, the tilt angle is an angle with respect to the horizontal direction of the tip 180 of the blade 18 extending in the left-right direction of the vehicle. As described above, the controller 26 calculates the tilt angle from the stroke amount of the tilt cylinder 21.

In step S205, the controller 26 acquires the orientation of the work vehicle 1 when the input operation by the operator is performed. The orientation of the work vehicle 1 corresponds to the traveling direction of the work vehicle 1 described above, and is acquired by, for example, the vehicle body position data from the GNSS receiver 32.

In step S206, the controller 26 determines the simplified design surface 62. The controller 26 determines, as the simplified design surface 62, a plane passing through the reference point P1, extending toward the orientation of the work vehicle 1, and having a longitudinal gradient of the pitch angle and a cross gradient of the tilt angle. Thereby, the simplified design surface 62 parallel to the orientation, the pitch angle, and the tilt angle of the work vehicle 1 and passing through the reference point P1 is generated. Then, in step S207, the controller 26 determines the simplified design surface 62 as a target design surface. The controller 26 stores design surface data indicating the determined simplified design surface 62 in the storage device 28.

Figure 11:
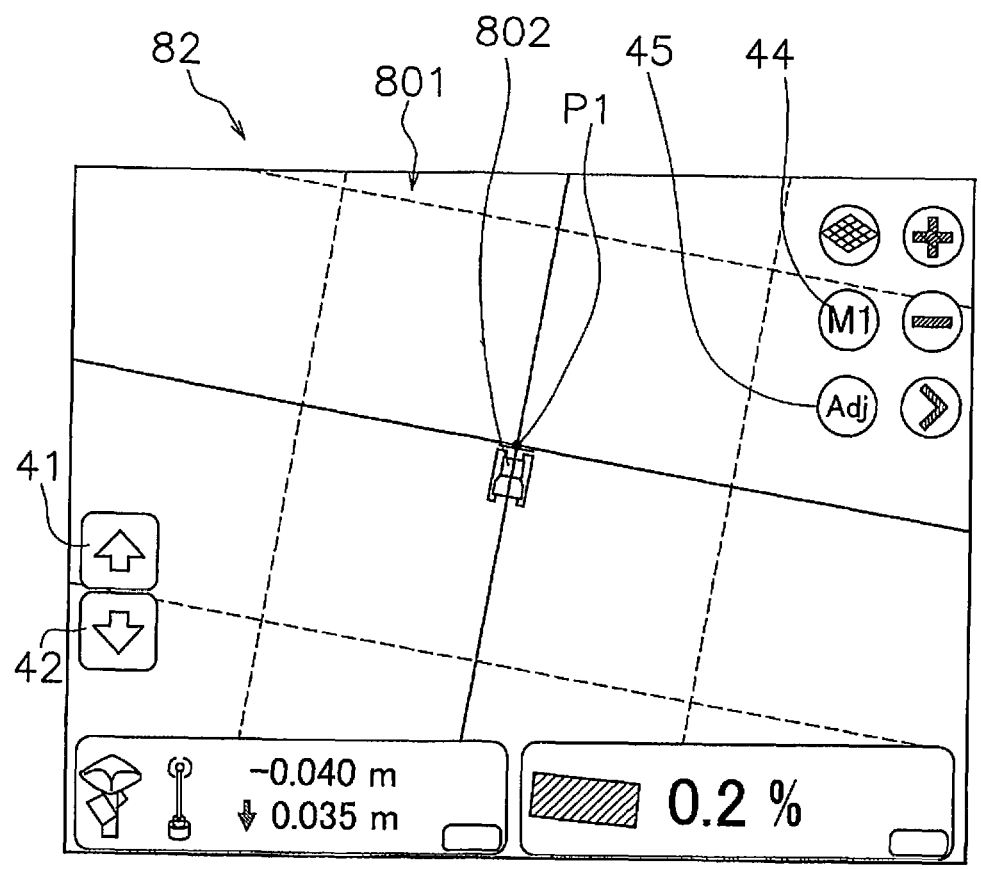
FIG. 11 is a diagram showing an example of the operation screen in the first mode.
Figure 12:
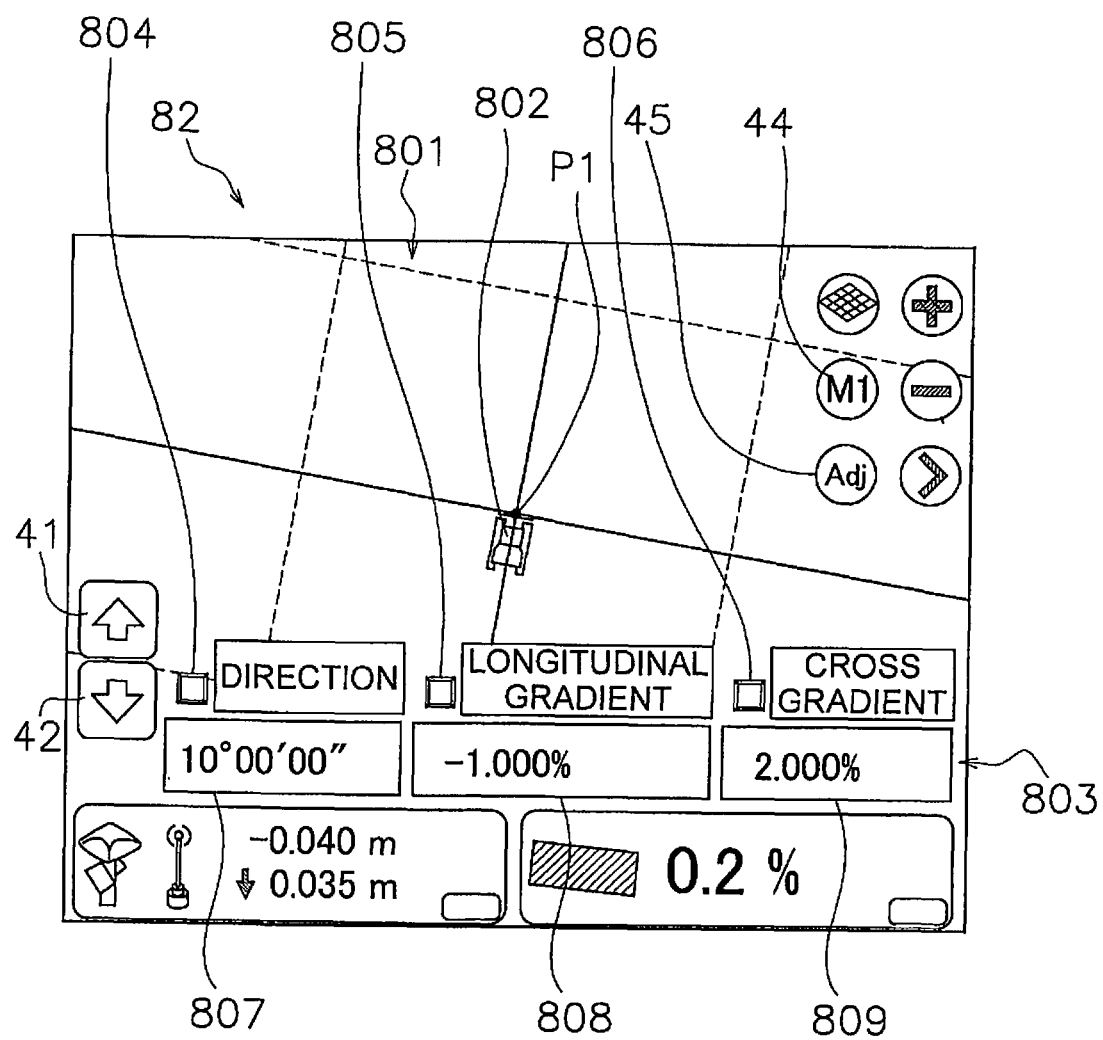
FIG. 12 is a diagram showing an example of the operation screen in the first mode.
Figure 13:
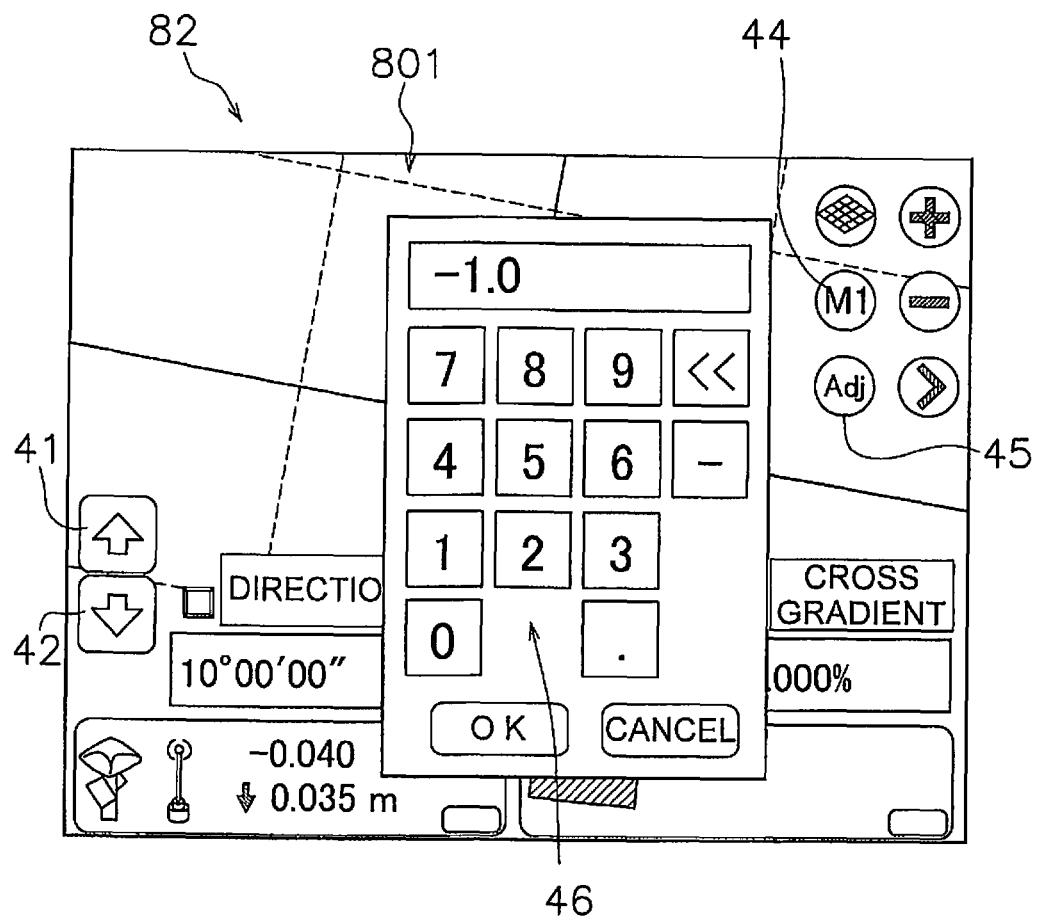
FIG. 13 is a diagram showing an example of the operation screen in the first mode.

As shown in FIG. 11, the operation screen 82 of the first mode includes an adjustment key 45. When the operator presses the adjustment key 45, an adjustment display 803 shown in FIG. 12 is displayed on the operation screen 82. The adjustment display 803 includes a fixing selection column 804 of the direction, a fixing selection column 805 of the longitudinal gradient, and a fixing selection column 806 of the cross gradient. Further, the adjustment display 803 includes a input column 807 of the direction, an input column 808 of the longitudinal gradient, and an input column 809 of the cross gradient.

The fixing selection column 804 of the direction is a column for selecting whether to fix the direction of the simplified design surface 62 regardless of the orientation of the vehicle when the simplified design surface 62 is generated. In the present embodiment, the fact that the check is input in the fixing selection column 804 of the direction indicates "OK", and the fact that the check is not input indicates "NO". Hereinafter, in the other fixing selection columns as well, the fact that the check is input in the fixing selection column indicates "OK" and the fact that the check is not input indicates "NO".

When the fixing selection column 804 of the direction is "No", the orientation of the work vehicle 1 when the input operation by the operator is performed is set as the direction of the simplified design surface 62. When the fixing selection column 804 of the direction is "OK", the direction of the simplified design surface 62 is fixed to the value input in the input column 807 of the direction.

The fixing selection column 805 of the longitudinal gradient is a column for selecting whether to fix the longitudinal gradient regardless of the pitch angle of the vehicle body 11 when the simplified design surface 62 is generated. In the present embodiment, when the fixing selection column 805 of the longitudinal gradient is "No", the pitch angle of the vehicle body 11 when the input operation by the operator is performed is set as the longitudinal gradient of the simplified design surface 62. When the fixing selection column 805 of the longitudinal gradient is "OK", the longitudinal gradient of the simplified design surface 62 is fixed to the value input to the input column 808 of the longitudinal gradient.

The fixing selection column 806 of the cross gradient is a column for selecting whether to fix the cross gradient regardless of the tilt angle of the work implement 13 when the simplified design surface 62 is generated. When the fixing selection column 806 of the cross gradient is "No", the tilt angle of the work implement 13 when the input operation by the operator is performed is set as the cross gradient of the simplified design surface 62. When the fixing selection column 806 of the cross gradient is "OK", the cross gradient of the simplified design surface 62 is fixed to the value input in the input column 809 of the cross gradient.

The input of the numerical values into the respective input columns 807 to 809 is performed, for example, by the numerical value input key 46 shown in FIG. When the operator presses the input column 807 of the direction, the numerical value input key 46 is displayed on the operation screen 82. The operator can input a numerical value in the input column 807 of the direction by pressing the numerical value input key 46. Similarly, the operator can input numerical values into the respective input columns 808 and 809 by pressing the numerical value input key 46.

The controller 26 receives a setting signal indicating the setting operation of the operator by the adjustment display 803 from the input device 25b. The controller 26 changes the direction, the longitudinal gradient and the lateral gradient of the simplified design surface 62 based on the setting signal.

Figure 14:
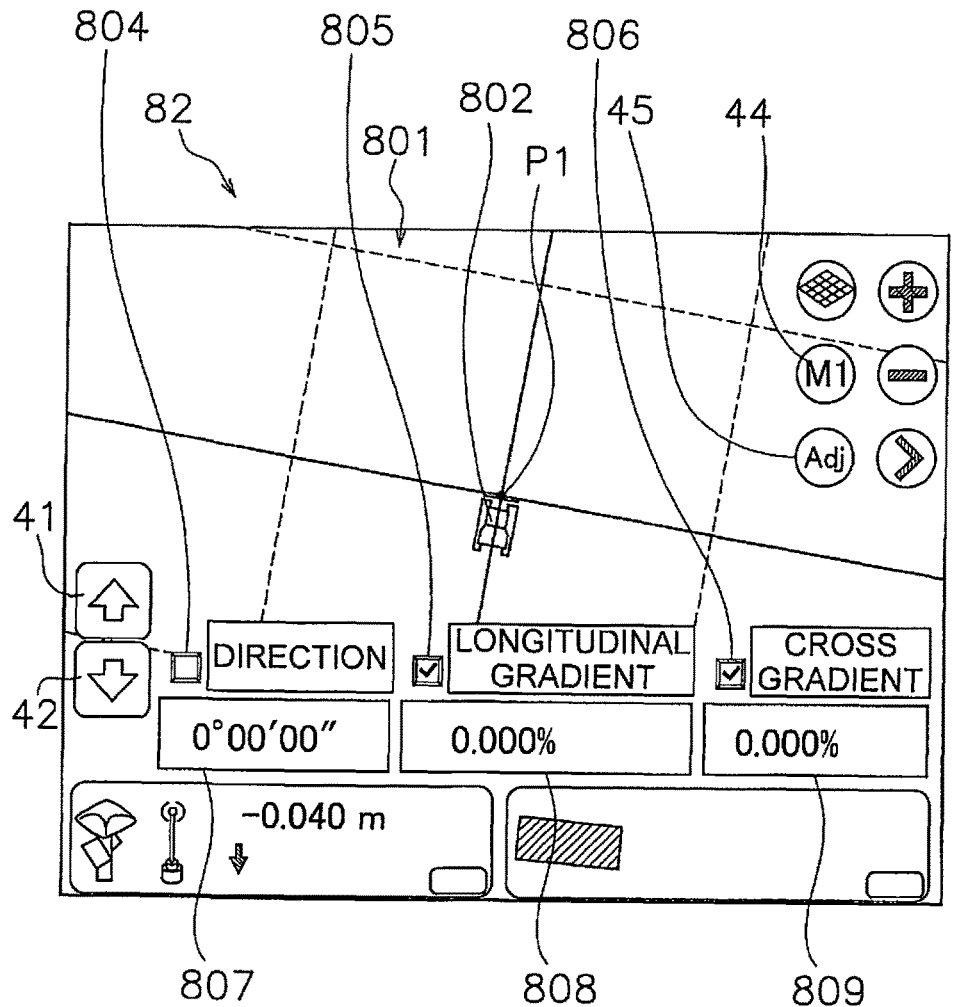
FIG. 14 is a diagram showing an example of the operation screen in the first mode.

For example, as shown in FIG. 14, the fixing selection column 805 of the longitudinal gradient and the fixing selection column 806 of the cross gradient are "OK", and both the input column 808 of the longitudinal gradient and the input column 809 of the cross gradient are 0%. In this case, as shown in FIGS. 15 and 16, a flat plane parallel to the horizontal plane, passing through the reference point P1, and extending in the same direction as the orientation of the work vehicle 1, is generated as the simplified design surface 62.

Figure 15:
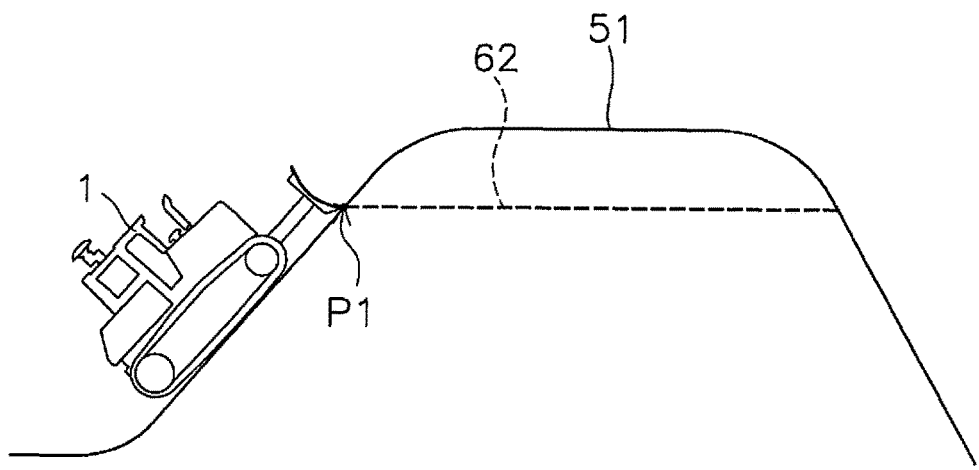
FIG. 15 is a diagram showing an example of a simplified design surface.
Figure 16:
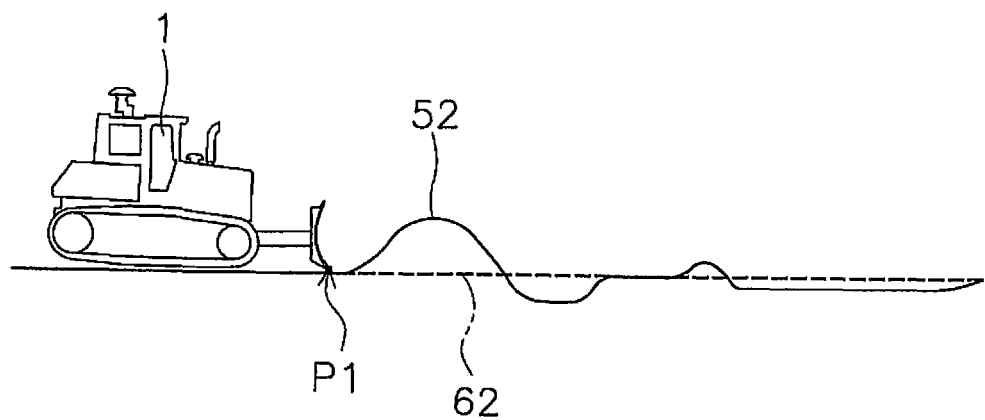
FIG. 16 is a diagram showing an example of the simplified design surface.

Thereby, for example, in FIG. 15, the work implement 13 is controlled in accordance with the simplified design surface 62, so that the upper portion of the raised topography 51 by the stocked soil is scraped to form a flat shape. Further, in FIG. 16, the uneven ground 52 is leveled to form a flat shape.

In these cases, the operator may operate the decision button (44) of the first mode in a state where the blade tip position P0 is aligned with the position where the digging is to be started. Thereby, the blade tip position P0 is set as the reference point P1, and the horizontal simplified design surface 62 passing through the reference point P1 is set as the target design surface. The controller 26 can easily form the above-described shape by controlling the work implement 13 according to the target design surface. Therefore, the controller 26 can generate the simplified design surface 62 without acquiring the actual topography data indicating the raised topography 51 of FIG. 15 or the uneven ground 52 of FIG. 16.

Figure 17:
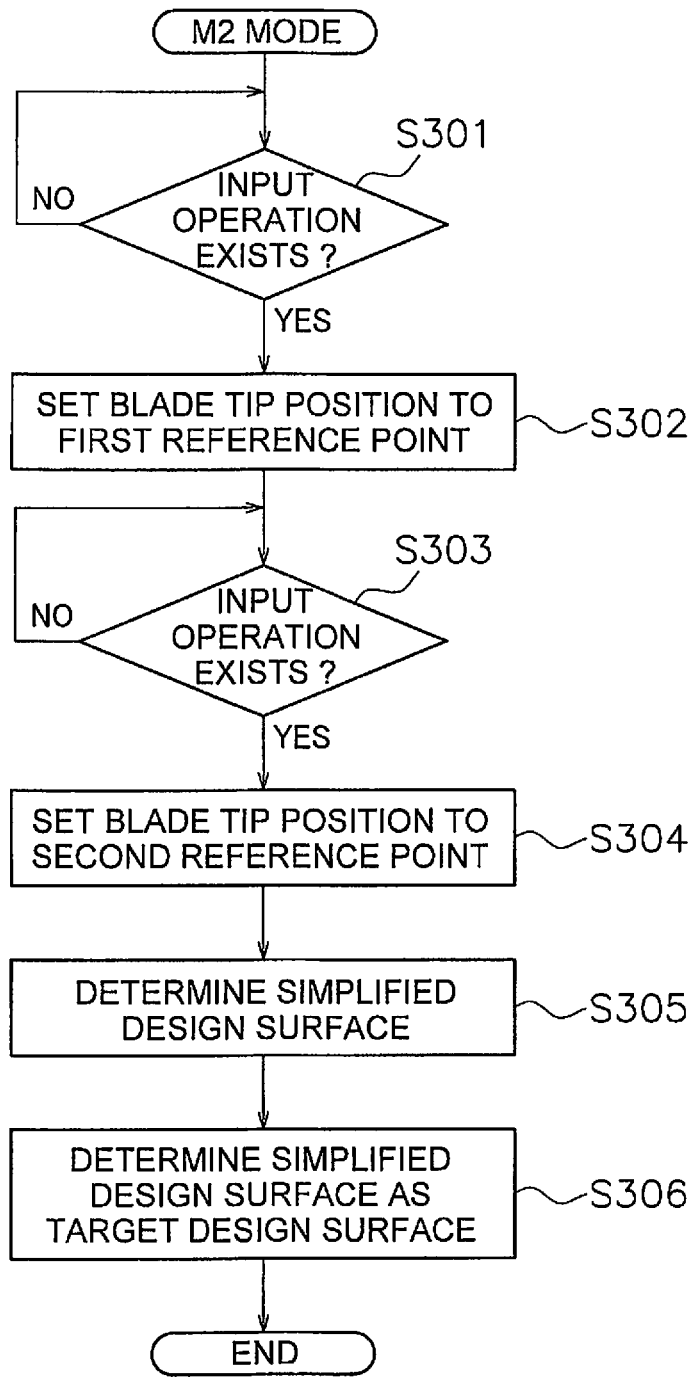
FIG. 17 is a flowchart showing processing in a second mode.

Next, the second mode will be described. In the second mode, two positions of the work vehicle 1 on which the input operation by the operator has been performed are stored as reference points P1 and P2. In the second mode, a flat plane passing through the two reference points P1 and P2 is generated as the simplified design surface 62. FIG. 17 is a flowchart showing processing in the second mode.

Figure 18:
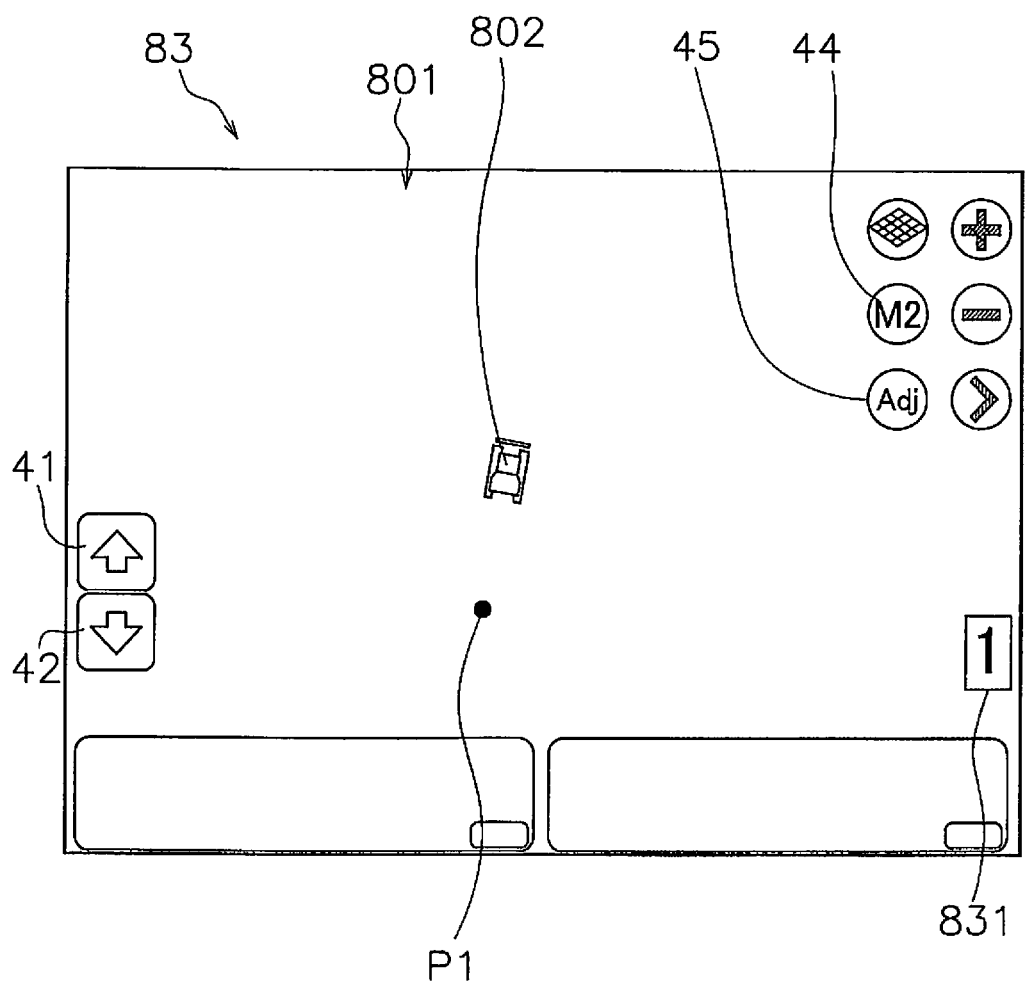
FIG. 18 is a diagram showing an example of the operation screen in the second mode.

As shown in FIG. 17, in step S301, the controller 26 determines the presence or absence of the input operation by the operator for determining the first reference point P1. When the controller 26 receives an input signal indicating the input operation by the operator for determining the first reference point P1 from the input device 25b, the controller 26 determines that the input operation by the operator is present. Specifically, FIG. 18 is a view showing an example of the operation screen 83 in the second mode. As shown in FIG. 18, when a long press of the decision button (44) for the second mode on the operation screen 83 is performed, the controller 26 determines that there is an input operation by the operator for determining the first reference point P1.

In step S302, the controller 26 acquires the blade tip position P0 when the input operation by the operator is performed, and sets it to the first reference point P1. As in the first mode, the controller 26 sets the center of the tip 180 in the left-right direction as the first reference point P1. The controller 26 stores the coordinates indicating the first reference point P1 in the storage device 28 as reference position information.

In step S303, the controller 26 determines the presence or absence of the input operation by the operator for determining the second reference point P2. When the controller 26 receives an input signal indicating the input operation by the operator for determining the second reference point P2 from the input device 25b, the controller 26 determines that the input operation by the operator is present. Similar to the first reference point P1, when a long press of the decision button (44) for the second mode on the operation screen 83 is performed, the controller 26 determines that there is an input operation by the operator for determining the second reference point P2.

In step S304, the controller 26 acquires the blade tip position P0 when the input operation by the operator is performed, as in the first reference point P1, and sets it as the second reference point P2. The controller 26 stores the coordinates indicating the second reference point P2 in the storage device 28 as reference position information.

Note that, as shown in FIG. 18, on the operation screen 83 in the second mode, a counter 831 indicating the number of reference points P1 to P2 determined is displayed. When the reference points P1 and P2 have not been determined yet, "0" is displayed on the counter 831. When only the first reference point P1 is determined in step S302, "1" is displayed on the counter 831. When the first and second reference points P1 and P2 are determined in step S304, "2" is displayed on the counter 831.

In step S305, the controller 26 determines the simplified design surface 62. The controller 26 determines a flat plane passing through the first reference point P1 and the second reference point P2 as the simplified design surface 62. The controller 26 calculates the orientation of the vehicle and the longitudinal gradient from the coordinates of the first reference point P1 and the second reference point P2. In the second mode, the cross gradient is fixed to a predetermined value. For example, the cross gradient in the second mode is set to 0% as an initial value. However, the operator can change the cross gradient from the initial value by inputting a desired value in the input column 809 of the cross gradient.

Then, in step S306, the controller 26 determines the simplified design surface 62 as a target design surface. The controller 26 stores design surface data indicating the determined simplified design surface 62 in the storage device 28.

Figure 19:
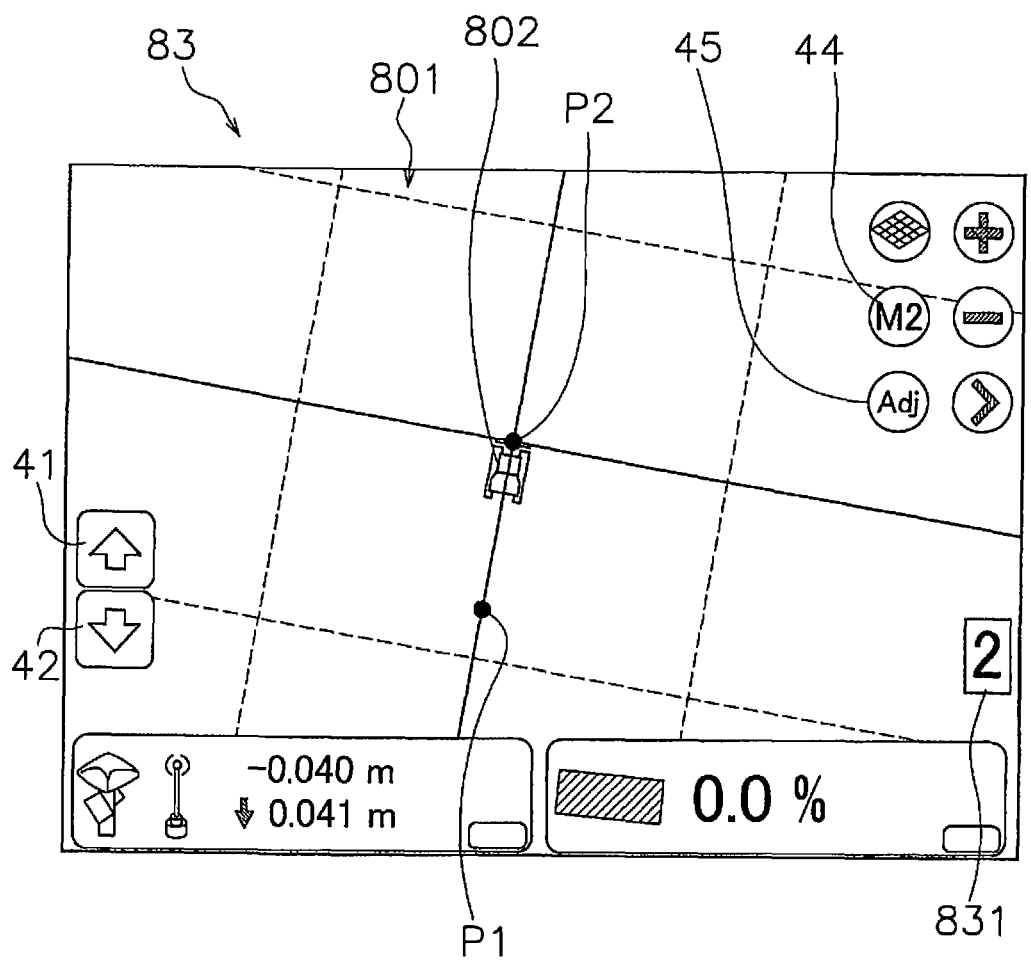
FIG. 19 is a diagram showing an example of the operation screen in the second mode.
Figure 20:
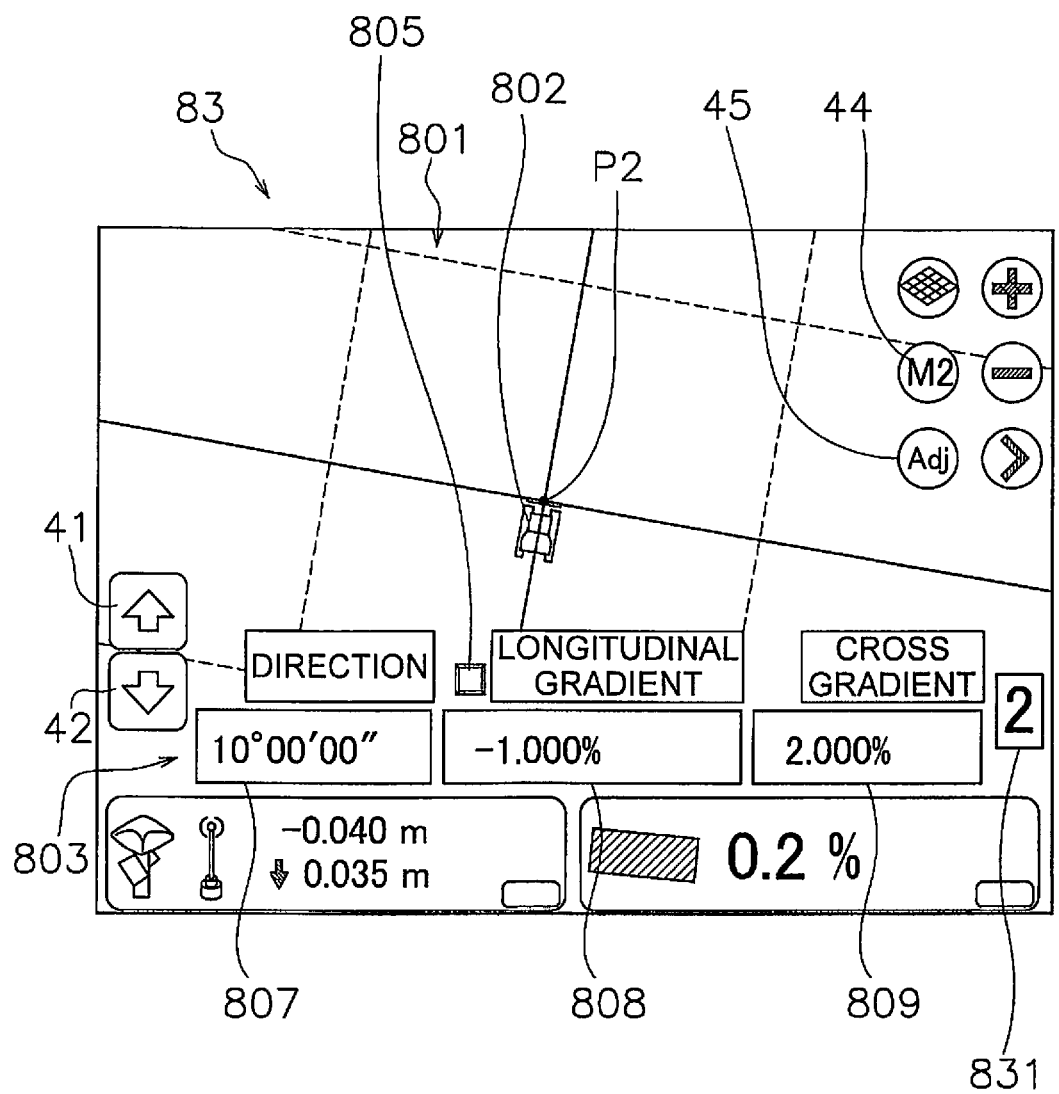
FIG. 20 is a diagram showing an example of the operation screen in the second mode.

Note that, as shown in FIG. 19, the operation screen 83 in the second mode also includes the adjustment key 45 in the same manner as the operation screen 82 in the first mode. When the operator presses the adjustment key 45, an adjustment display 803 shown in FIG. 20 is displayed on the operation screen 83. The adjustment display 803 in the second mode is substantially the same as the adjustment display 803 in the first mode. However, in the second mode, it is possible to select whether or not only the longitudinal gradient is fixed, and the direction cannot be fixed. Also, the cross gradient is fixed only. Therefore, the adjustment display 803 of the second mode includes the fixing selection column 805 of the longitudinal gradient but does not include the fixing selection column 804 of the direction and the fixing selection column 806 of the cross gradient. However, the operator can change the direction of the simplified design surface 62, the longitudinal gradient, and the cross gradient by inputting numerical values in the respective input columns 807 to 809.

Figure 21:
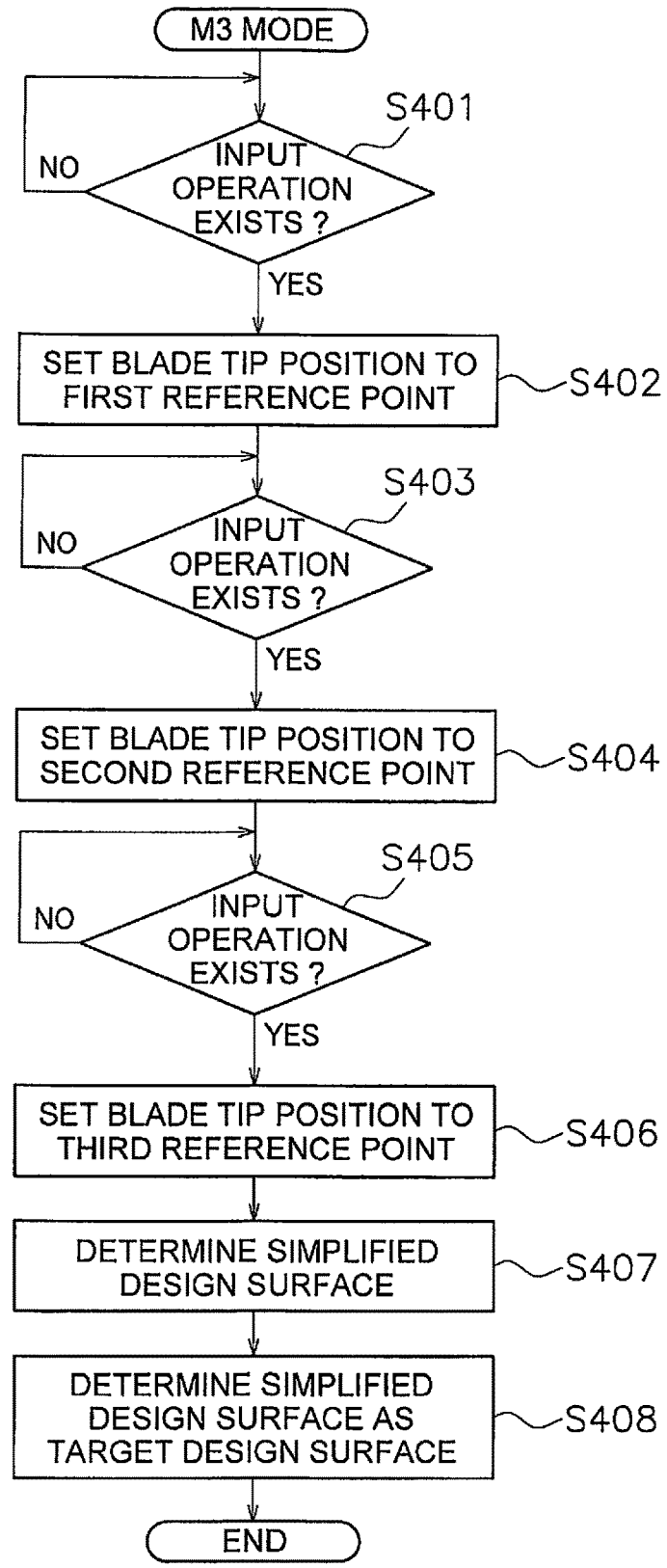
FIG. 21 is a flowchart showing processing in a third mode.

Next, the third mode will be described. In the third mode, three positions of the work vehicle 1 on which the input operation by the operator has been performed are stored as reference points P1 to P3. In the third mode, a flat plane passing through the three reference points P1 to P3 is generated as the simplified design surface 62. FIG. 21 is a flowchart showing processing in the third mode.

The processing from step S401 to step S404 is the same as the processing from step S301 to step S304 in the second mode, so the description will be omitted.

Figure 22:
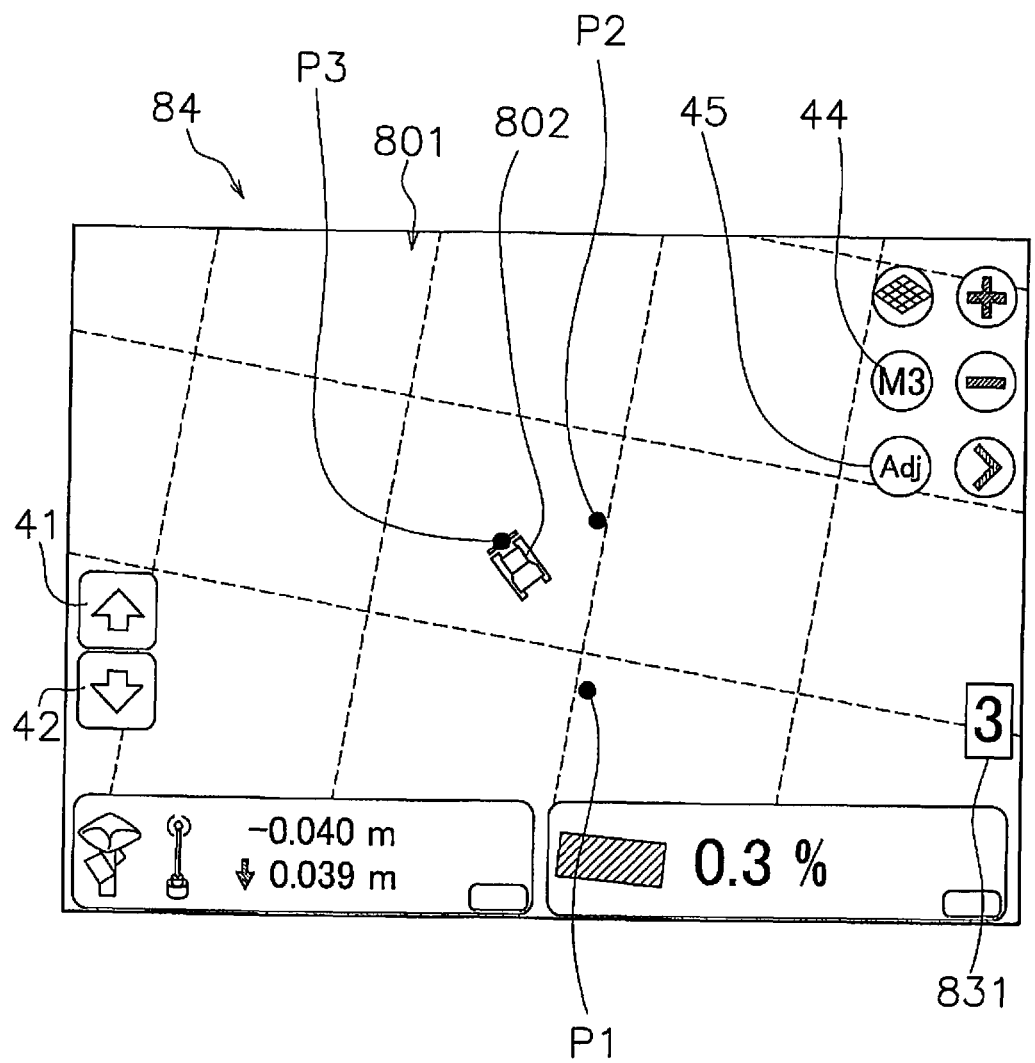
FIG. 22 is a diagram showing an example of the operation screen in the third mode.

In step S405, the controller 26 determines the presence or absence of the input operation by the operator for determining the third reference point P3. When the controller 26 receives an input signal indicating the input operation by the operator for determining the third reference point P3 from the input device 25b, the controller 26 determines that the input operation by the operator is present. Specifically, FIG. 22 is a view showing an example of the operation screen 84 in the third mode. As shown in FIG. 22, when a long press of the decision button (44) for the third mode on the operation screen 84 is performed, the controller 26 determines that there is an input operation by the operator for determining the third reference point P3.

In step S406, the controller 26 acquires the blade tip position P0 when the input operation by the operator is performed, as in the case of the first and second reference points P1 and P2, and sets it to the third reference point P3.

The controller 26 stores the coordinates indicating the third reference point P3 in the storage device 28 as reference position information.

As shown in FIG. 22, on the operation screen 84 of the third mode, a counter 831 indicating the number of reference points P1 to P3 determined is displayed as in the second mode. The counter 831 displays the number of the determined reference points P1 to P3.

In step S407, the controller 26 determines the simplified design surface 62. The controller 26 determines a flat plane passing through the first reference point P1, the second reference point P2 and the third reference point P3 as the simplified design surface 62. The controller 26 calculates the orientation of the vehicle, the longitudinal gradient, and the cross gradient from the coordinates of the first reference point P1, the second reference point P2, and the third reference point P3.

Then, in step S408, the controller 26 determines the simplified design surface 62 as a target design surface. The controller 26 stores design surface data indicating the determined simplified design surface 62 in the storage device 28.

Figure 23:
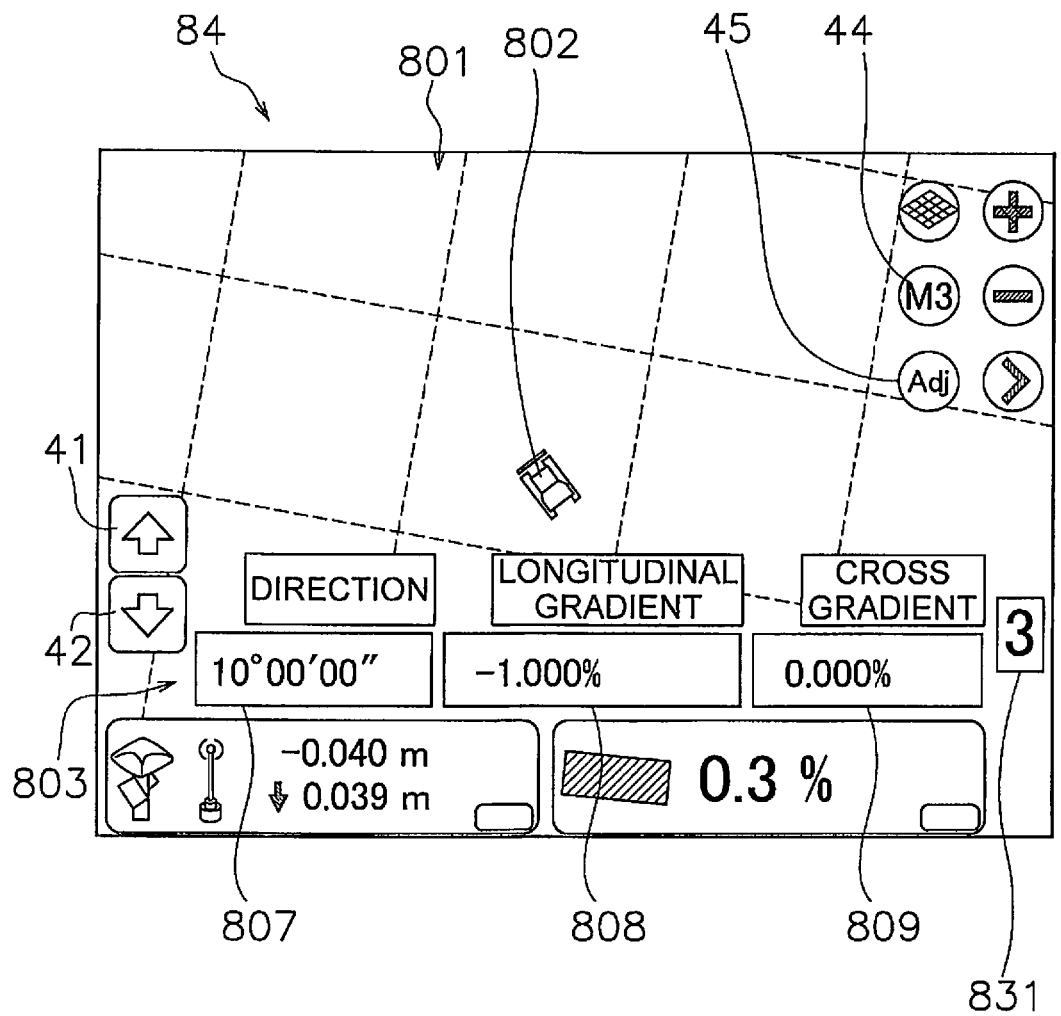
FIG. 23 is a view showing an example of the operation screen in the third mode.

Note that, as shown in FIG. 23, the operation screen 84 in the third mode also includes the adjustment key 45, as in the operation screen 82 in the first mode and the operation screen 83 in the second mode. When the operator presses the adjustment key 45, an adjustment display 803 shown in FIG. 23 is displayed on the operation screen. The adjustment display 803 in the third mode is substantially the same as the adjustment display 803 in the first mode and the adjustment display 803 in the second mode. However, in the third mode, it is impossible to fix the direction, fix the longitudinal gradient, and fix the cross gradient. Therefore, the adjustment display 803 of the third mode does not include the fixing selection column 804 of the direction, the fixing selection column 805 of the longitudinal gradient, and the fixing selection column 806 of the cross gradient. However, the operator can change the direction of the simplified design surface 62, the longitudinal gradient, and the cross gradient by inputting numerical values in the respective input columns 807 to 809.

According to the control system 3 of the work vehicle 1 according to present embodiment described above, when the target design surface is positioned above the actual surface 50, the work implement 13 is controlled along the target design surface, and the soil is thereby thinly placed on the actual surface 50. In addition, when the target design surface is lower than the actual surface 50, the work implement 13 is controlled along the target design surface, and digging is thereby performed while controlling the load on the work implement 13 from being excessive. Thereby, the quality of the work finish can be improved. In addition, automatic control can improve the efficiency of work.

Further, by setting the reference points P1-P3 in the first to third modes, the simplified design surface 62 passing through the reference points P1-P3 can be generated and set as a target design surface. Thus, the operator can easily set a new target design surface according to the situation.

For example, in the first mode, the operator places the tip 180 of the blade 18 at the start position of work and operates the decision button (44) of the first mode to set the blade tip position P0 as the reference point P1 and thereby a horizontal simplified design surface 62 passing through the reference point P1 can be generated and set as a target design surface. Alternatively, with the blade tip position P0 as the reference point P1, the simplified design surface 62 parallel to the pitch angle and/or the tilt angle passing through the reference point P1 can be generated and set as the target design surface.

In the second mode, the operator places the tip at the start position of work and operates the decision button (44) of the second mode to set the blade tip position P0 as the first reference point P1. Then, the operator moves the work vehicle 1 and places the tip 180 at a position where the tip 180 is to be passed, and operates the decision button (44) of the second mode to set the blade tip position P0 as the second reference point P2. Thereby, the flat simplified design surface 62 passing through the first reference point P1 and the second reference point P2 can be generated and set as a target design surface.

In the third mode, as in the second mode, after setting the first and second reference points P1 and P2, the operator further moves the work vehicle 1. Then, the operator places the tip 180 at a position where the tip 180 is to be passed and operates the decision button (44) of the second mode to set the blade tip position P0 as the third reference point P3. Thereby, the flat simplified design surface 62 passing through the first reference point P1, the second reference point P2 and the third reference point P3 can be generated and set as a target design surface.

As mentioned above, although one embodiment of the present invention was described, the present invention is not limited to the above embodiment, a various modifications are possible without departing from the gist of the invention.

The work vehicle 1 is not limited to a bulldozer, but may be another vehicle such as a wheel loader or a motor grader.

The work vehicle 1 may be a remotely steerable vehicle. In that case, a part of the control system 3 may be disposed outside the work vehicle 1. For example, the controller 26 may be disposed outside the work vehicle 1. The controller 26 may be located in a control center remote from the work site.

Figure 24:
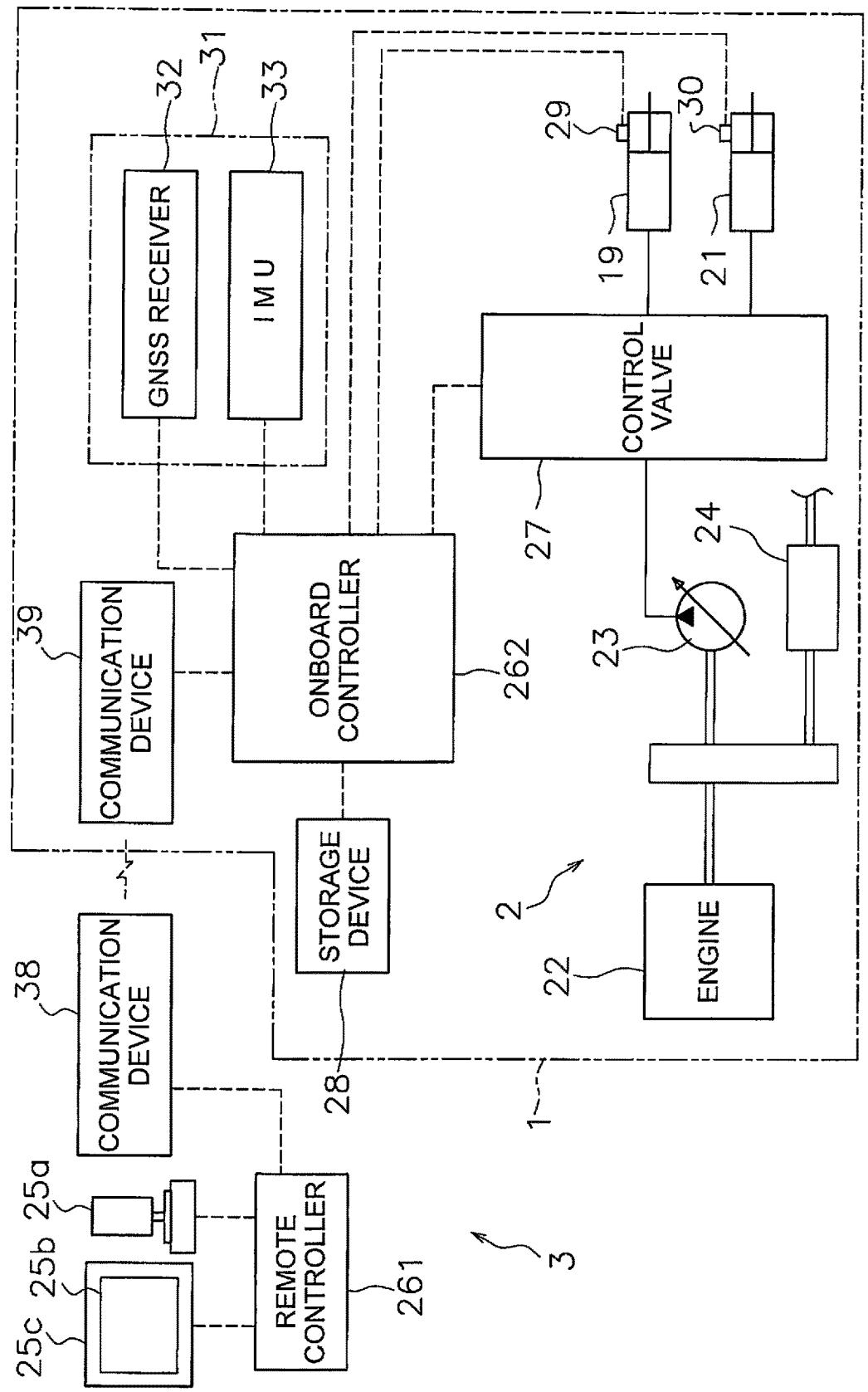
FIG. 24 is a block diagram showing a configuration of a drive system and a control system for the work vehicle according to another embodiment.

The controller 26 may include a plurality of controllers separate from one another. For example, as shown in FIG. 24, the controller 26 may include a remote controller 261 disposed outside the work vehicle 1 and an onboard controller 262 mounted on the work vehicle 1. The remote controller 261 and the onboard controller 262 may be able to communicate wirelessly via the communication devices 38 and 39. Then, a part of the functions of the controller 26 described above may be performed by the remote controller 261, and the remaining functions may be performed by the onboard controller 262. For example, the process of determining the design surfaces 60 and 70 may be performed by the remote controller 261, and the process of outputting a command signal to the work implement 13 may be performed by the onboard controller 262.

The operating device 25a, the input device 25b, and the display 25c may be disposed outside the work vehicle 1. In that case, the operating cabin may be omitted from the work vehicle 1. Alternatively, the operating device 25a, the input device 25b, and the display 25c may be omitted from the work vehicle 1. The work vehicle 1 may be operated only by the automatic control by the controller 26 without the operation by the operating device 25a and the input device 25b.

Figure 25:
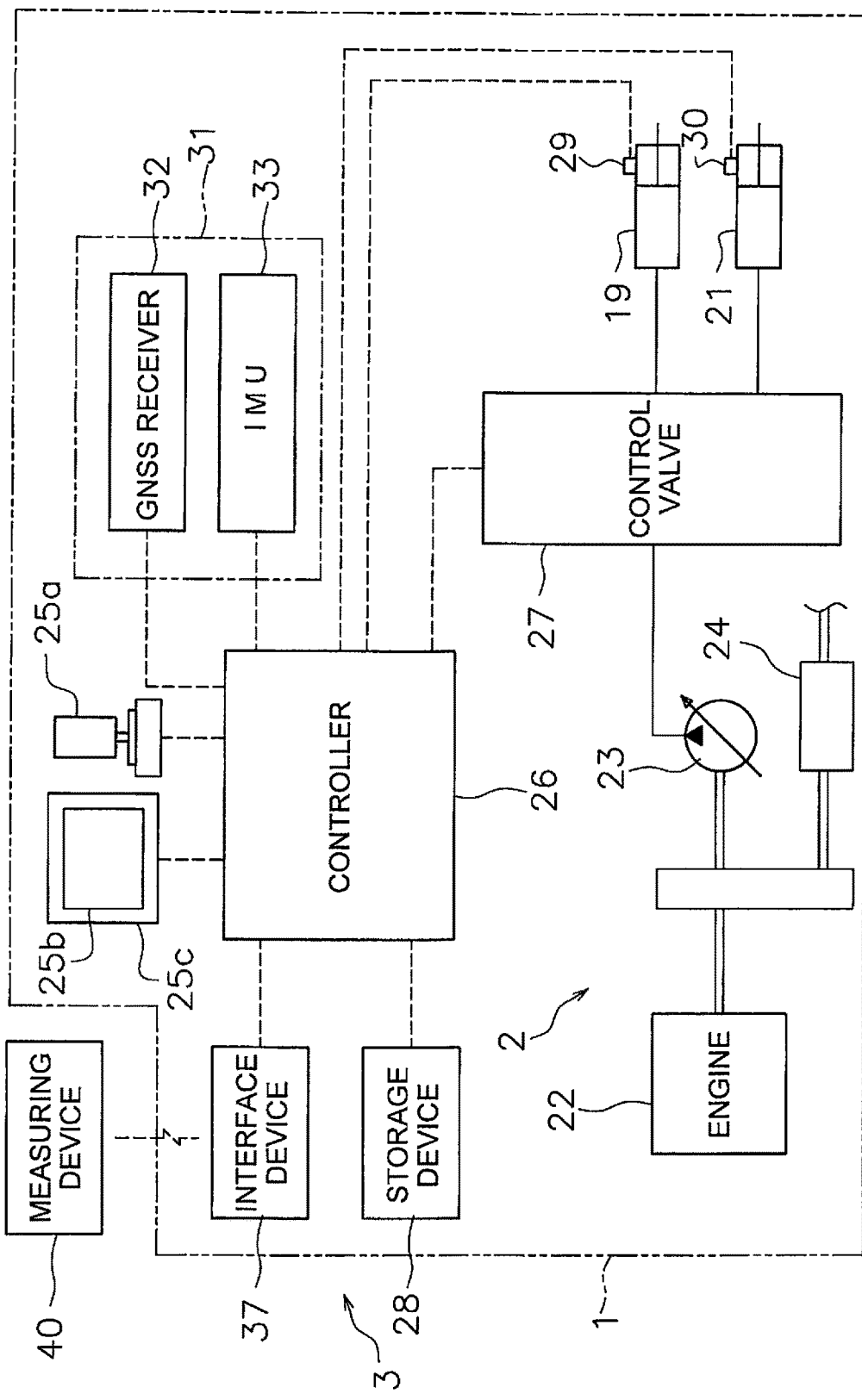
FIG. 25 is a block diagram showing a configuration of a drive system and a control system for the work vehicle according to another embodiment.
Figure 26:
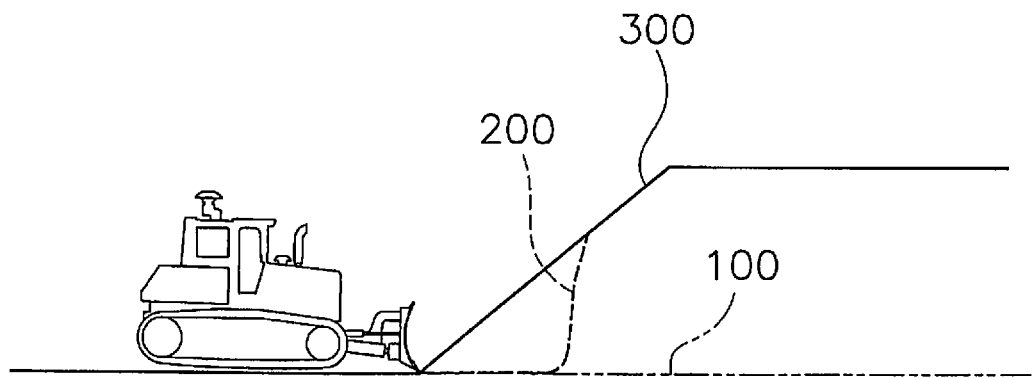
FIG. 26 is a diagram illustrating an example of the related art.
Figure 27:
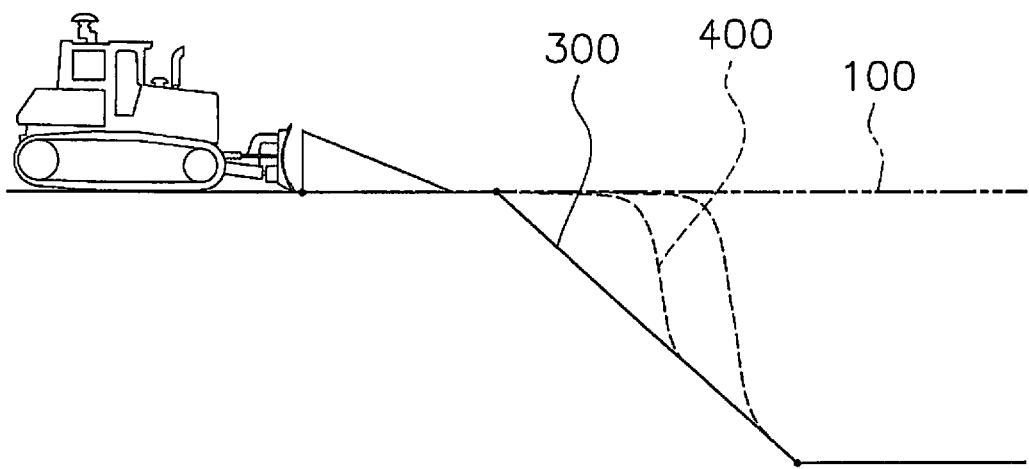
FIG. 27 is a diagram illustrating an example of the related art.

The actual surface 50 may be acquired by not only the position sensing device 31 described above, but also other devices. For example, as shown in FIG. 25, the actual surface 50 may be acquired by the interface device 37 that receives data from an external device. The interface device 37 may wirelessly receive the actual topography data measured by the external measuring device 40. Alternatively, the interface device 37 may be a recording medium reading device, and may receive actual topography data measured by the external measuring device 40 via the recording medium.

The input device 25b is not limited to a touch panel device, and may be a device such as a switch. The operation keys 41 to 43 described above are not limited to the software keys displayed on the touch panel, and may be hardware keys. The operation keys 41-43 may be changed. For example, the up key 41 and the down key 42 may be omitted.

The decision button (44) of the first mode, the decision button (44) of the second mode, and the decision button (44) of the third mode may be hardware keys. For example, the decision button (44) of the first mode, the decision button (44) of the second mode, and the decision button (44) of the third mode may be disposed on the operating device 25a. The decision button (44) of the first mode, the decision button (44) of the second mode, and the decision button (44) of the third mode are not limited to the common key but may be different keys.

The position of the work vehicle 1 is not limited to the blade tip position P0 as in the above embodiment, but may be another position. For example, the position of the work vehicle 1 may be the position of a predetermined portion of the vehicle body 11. For example, the position of the work vehicle 1 may be a predetermined position of the bottom surface 160 of the crawler belt 16.

The inclination angle in the longitudinal direction of the work vehicle 1 is not limited to the pitch angle of the vehicle body 11 as in the above embodiment, but may be another angle. For example, the tilt angle of the work vehicle 1 in the longitudinal direction may be the lift angle of the work implement 13.

The inclination angle in the left-right direction of the work vehicle 1 is not limited to the tilt angle of the work implement 13 as in the above embodiment, but may be another angle. For example, the tilt angle of the work vehicle 1 in the left-right direction may be the roll angle of the vehicle body 11.

The second mode and/or the third mode may be omitted. Also, the normal mode may be omitted and only the first mode may be executable.

The operation screen may be changed. For example, the operation screen may include a side view including an image indicating the topography of the work site and an icon indicating the current position of the work vehicle 1. The adjustment display 803 of the first to third modes may be changed or omitted.

According to the present invention, it is possible to provide a control system for a work vehicle, a method for setting trajectory of a work implement, and a work vehicle that can perform work with high quality and finish efficiently by automatic control.

The invention claimed is:

1. A control system for a work vehicle including a work implement, the control system comprising:
   an input device; and
   a controller configured to
      acquire information regarding an actual surface of a work site and a final design surface,
      communicate with the input device,
      set a normal mode or an alternative mode in response to an operation by an operator,
      in the normal mode, generate an intermediate design surface as a target design surface, the intermediate design surface being located between the actual surface and the final design surface,
      in the alternative mode, receive an input signal indicating an input operation by an operator from the input device, acquire vehicle information including a position of the work vehicle when the input signal is received, and orientation information of the work vehicle when the input signal is received, determine a simplified design surface as the target design surface, the simplified design surface indicating a target trajectory of the work implement based on the vehicle information and the orientation information, and issue a command signal to automatically control the work implement to move along the target design surface while the work vehicle moves in a traveling direction.

2. The control system for a work vehicle according to claim 1, wherein the controller further is configured to determine, as the target design surface, a plane passing through the position of the work vehicle and extending in the traveling direction of the work vehicle when the input signal is received.

3. The control system for a work vehicle according to claim 1, wherein the work implement includes a tip, and the position of the work vehicle is a position of the tip.

4. The control system for a work vehicle according to claim 1, wherein the work vehicle includes a vehicle body to which the work implement is attached, and the position of the work vehicle is a position of a predetermined portion of the vehicle body.

5. The control system for a work vehicle according to claim 1, wherein the vehicle information includes an inclination angle of the work vehicle in a longitudinal direction of the work vehicle with respect to a horizontal direction, and the controller is further configured to determine, as the target design surface, a plane passing through the position of the work vehicle and extending in the traveling direction of the work vehicle when the input signal is received, and having a longitudinal gradient equal to the inclination angle in the longitudinal direction.

6. The control system for a work vehicle according to claim 5, wherein the work vehicle includes a vehicle body to which the work implement is attached, and the inclination angle of the work vehicle in the longitudinal direction is a pitch angle of the vehicle body.

7. The control system for a work vehicle according to claim 5, wherein the inclination angle of the work vehicle in the longitudinal direction is a lift angle of the work implement.

8. The control system for a work vehicle according to claim 1, wherein the vehicle information includes an inclination angle of the work vehicle in a left-right direction of the work vehicle with respect to a horizontal direction, and the controller is further configured to determine, as the target design surface, a plane passing through the position of the work vehicle and extending in the traveling direction of the work vehicle when the input signal is received, and having a cross gradient equal to the inclination angle in the left-right direction.

9. The control system for a work vehicle according to claim 8, wherein the work vehicle includes a vehicle body to which the work implement is attached, and the inclination angle of the work vehicle in the left-right direction is a roll angle of the vehicle body.

10. The control system for a work vehicle according to claim 8, wherein the inclination angle of the work vehicle in the left-right direction is a tilt angle of the work implement.

11. The control system for a work vehicle according to claim 1, wherein the controller is further configured to receive a setting signal indicating a setting operation by an operator from the input device; and change at least one of the orientation information and the vehicle information based on the setting signal.

12. A method for setting a target trajectory of a work implement of a work vehicle, the method comprising using a controller to execute:

acquiring information regarding an actual surface of a work site and a final design surface;

setting a normal mode or an alternative mode in response to an operation by an operator;

in when normal mode is set, generating an intermediate design surface as a target design surface, the intermediate design surface being located between the actual surface and the final design surface;

when the alternative mode is set, receiving an input signal indicating an input operation by the operator;

acquiring vehicle information including a position of the work vehicle when the input signal is received, and orientation information of the work vehicle when the input signal is received, determining a simplified design surface as the target design surface, the simplified design surface indicating a target trajectory of the work implement based on the vehicle information and the orientation information when the input signal is received; and issuing a command signal to automatically control the work implement to move along the target design surface while the work vehicle moves in a traveling direction.

13. The method for setting a target trajectory of a work implement according to claim 12, wherein a plane is determined as the target design surface, the plane passing through the position of the work vehicle and extending in the traveling direction of the work vehicle when the input signal is received.

14. The method for setting a target trajectory of a work implement according to claim 12, wherein the vehicle information includes an inclination angle of the work vehicle in a longitudinal direction of the work vehicle with respect to a horizontal direction, and a plane is determined as the target design surface, the plane passing through the position of the work vehicle and extending in the traveling direction of the work vehicle when the input signal is received, and having a longitudinal gradient equal to the inclination angle in the longitudinal direction.

15. The method for setting a target trajectory of a work implement according to claim 12, wherein the vehicle information includes an inclination angle of the work vehicle in a left-right direction of the work vehicle with respect to a horizontal direction, and a plane is determined as the target design surface, the plane
- passing through the position of the work vehicle and extending in the traveling direction of the work vehicle when the input signal is received, and
- having a cross gradient equal to the inclination angle in the left-right direction.

16. The method for setting a target trajectory of a work implement according to claim 12, the method further comprising using the controller to execute:
- receiving a setting signal indicating a setting operation by an operator; and
- determining the target design surface by changing, based on the setting signal, at least one of the orientation information and the vehicle information when the input signal is received.

17. A work vehicle comprising:
a work implement;
an input device; and
a controller configured to
- acquire information regarding an actual surface of a work site and a final design surface,
- set a normal mode or an alternative mode in response to an operation by an operator,
- in the normal mode, generate an intermediate design surface as a target design surface, the intermediate design surface being located between the actual surface and the final design surface,
- in the alternative mode,
  - receive an input signal indicating an input operation by the operator from the input device,
  - acquire vehicle information including a position of the work vehicle when the input signal is received, and orientation information of the work vehicle when the input signal is received,
  - determine a simplified design surface as the target design surface, the simplified design surface indicating a target trajectory of the work implement based on the vehicle information and the orientation information when the input signal is received, and
- automatically control the work implement to move along the target design surface by issuing a command signal while the work vehicle moves in a traveling direction.

18. The work vehicle according to claim 17, wherein
the controller is further configured to determine, as the target design surface, a plane passing through the position of the work vehicle and extending in the traveling direction of the work vehicle when the input signal is received.

19. The work vehicle according to claim 17, wherein
the vehicle information includes an inclination angle of the work vehicle in a longitudinal direction of the work vehicle with respect to a horizontal direction, and
the controller is configured to determine, as the target design surface, a plane
- passing through the position of the work vehicle and extending in the traveling direction of the work vehicle when the input signal is received, and
- having a longitudinal gradient equal to the inclination angle in the longitudinal direction.

20. The work vehicle according to claim 17, wherein
the vehicle information includes an inclination angle of the work vehicle in a left-right direction of the work vehicle with respect to a horizontal direction, and
the controller is further configured to determine, as the target design surface, a plane
- passing through the position of the work vehicle and extending in the traveling direction of the work vehicle when receiving the input signal, and
- having a cross gradient equal to the inclination angle in the left-right direction.

21. The work vehicle according to claim 17, wherein
the controller is further configured to
- receive a setting signal indicating a setting operation by an operator from the input device; and
- determine the target design surface by changing, based on the setting signal, at least one of the orientation information and the vehicle information when the input signal is received.

22. The work vehicle according to claim 17, further comprising:
a control valve arranged to receive the command signal from the controller and control a hydraulic pressure supplied to the work implement.

* * * * *